(12) United States Patent
Yokoyama et al.

(10) Patent No.: US 11,685,963 B2
(45) Date of Patent: *Jun. 27, 2023

(54) ZINC-PLATED STEEL SHEET AND MANUFACTURING METHOD THEREOF

(71) Applicant: NIPPON STEEL CORPORATION, Tokyo (JP)

(72) Inventors: Takafumi Yokoyama, Tokyo (JP); Kunio Hayashi, Tokyo (JP); Masahiro Nakata, Tokyo (JP); Yuji Yamaguchi, Tokyo (JP); Satoshi Uchida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 213 days.

This patent is subject to a terminal disclaimer.

(21) Appl. No.: 17/051,110

(22) PCT Filed: Apr. 26, 2019

(86) PCT No.: PCT/JP2019/017988
§ 371 (c)(1),
(2) Date: Oct. 27, 2020

(87) PCT Pub. No.: WO2019/212047
PCT Pub. Date: Nov. 7, 2019

(65) Prior Publication Data
US 2021/0230712 A1    Jul. 29, 2021

(30) Foreign Application Priority Data

May 1, 2018  (JP) .............................. JP2018-088417

(51) Int. Cl.
*C21D 9/46*   (2006.01)
*B32B 15/01*  (2006.01)
(Continued)

(52) U.S. Cl.
CPC .............. *C21D 9/46* (2013.01); *B32B 15/013* (2013.01); *C21D 1/26* (2013.01); *C21D 6/004* (2013.01);
(Continued)

(58) Field of Classification Search
CPC ... B32B 15/013; C21D 1/26; C21D 2211/001; C21D 2211/002; C21D 2211/005;
(Continued)

(56) References Cited

U.S. PATENT DOCUMENTS

2009/0238713 A1  9/2009  Kinugasa et al.
2013/0048151 A1  2/2013  Kawamura et al.
(Continued)

FOREIGN PATENT DOCUMENTS

JP   6-145891 A   5/1994
JP   9-111398 A   4/1997
(Continued)

OTHER PUBLICATIONS

"Metallic materials-13 Tensile testing—Method of test at room temperature", JIS Z 2241: 2011, total of 37 pages.
(Continued)

*Primary Examiner* — Jenny R Wu
(74) *Attorney, Agent, or Firm* — Birch, Stewart, Kolasch & Birch, LLP

(57) ABSTRACT

A zinc-plated steel sheet of an aspect of the present invention includes a steel sheet having a predetermined chemical composition and a zinc-plated layer. In the steel sheet, steel microstructures in a range of ⅛ thickness to ⅜ thickness, having the center at ¼ thickness from a steel sheet surface, include, by vol %, ferrite: 0% to 10%, bainite: 0% to 20%, tempered martensite: 70% or more, fresh martensite: 0% to 10%, retained austenite: 0% to 10%, and pearlite: 0% to 5%. In the zinc-plated steel sheet, the amount of hydrogen (Continued)

(1)

(2)

(3)

emitted when the steel sheet is heated to 200° C. from a room temperature after removal of the zinc-plated layer is 0.40 ppm or less per mass of the steel sheet, the tensile strength is 1470 MPa or more, and no cracking occurs in a U-shape bending test where a stress equivalent to 1000 MPa is applied for 24 hours.

16 Claims, 1 Drawing Sheet

(51) Int. Cl.
| | |
|---|---|
| C21D 1/26 | (2006.01) |
| C21D 6/00 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/10 | (2006.01) |
| C22C 38/12 | (2006.01) |
| C22C 38/16 | (2006.01) |
| C22C 38/22 | (2006.01) |
| C22C 38/26 | (2006.01) |
| C22C 38/30 | (2006.01) |
| C22C 38/38 | (2006.01) |
| C22C 38/60 | (2006.01) |
| C23C 2/06 | (2006.01) |
| C23C 2/28 | (2006.01) |
| C23C 2/40 | (2006.01) |

(52) U.S. Cl.
CPC ............ *C21D 6/005* (2013.01); *C21D 6/007* (2013.01); *C21D 6/008* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/16* (2013.01); *C22C 38/22* (2013.01); *C22C 38/26* (2013.01); *C22C 38/30* (2013.01); *C22C 38/38* (2013.01); *C22C 38/60* (2013.01); *C23C 2/06* (2013.01); *C23C 2/28* (2013.01); *C23C 2/40* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC ........ C21D 2211/008; C21D 2211/009; C21D 6/004; C21D 6/005; C21D 6/007; C21D 6/008; C21D 9/46; C21D 18/04; C21D 38/00; C21D 38/001; C21D 38/002; C21D 38/008; C21D 38/02; C21D 38/04; C21D 38/06; C21D 38/08; C21D 38/10; C21D 38/12; C21D 38/16; C21D 38/22; C21D 38/26; C21D 38/30; C21D 38/38; C21D 38/60; C21D 2/02; C21D 2/06; C21D 2/28; C21D 2/40; C21D 30/00
See application file for complete search history.

(56) References Cited

U.S. PATENT DOCUMENTS

| | | | |
|---|---|---|---|
| 2014/0234658 | A1 | 8/2014 | Nozaki et al. |
| 2016/0214351 | A1 | 7/2016 | Harako et al. |
| 2017/0314116 | A1 | 11/2017 | Kawata et al. |
| 2020/0190617 | A1 | 6/2020 | Hasegawa et al. |

FOREIGN PATENT DOCUMENTS

| | | |
|---|---|---|
| JP | 10-1740 A | 1/1998 |
| JP | 2007-197819 A | 8/2007 |
| WO | WO 2011/105385 A1 | 9/2011 |
| WO | WO 2013/047836 A1 | 4/2013 |
| WO | WO 2015/029404 A1 | 3/2015 |
| WO | WO 2018/124157 A1 | 7/2018 |

OTHER PUBLICATIONS

"Method for Charpy pendulum Impact test of metallic materials", JIS Z 2242: 2005, total of 12 pages.
"Method of hole expanding test", JFS T 1001-1996, The Japan Iron and Steel Federation Standard, total of 10 pages.

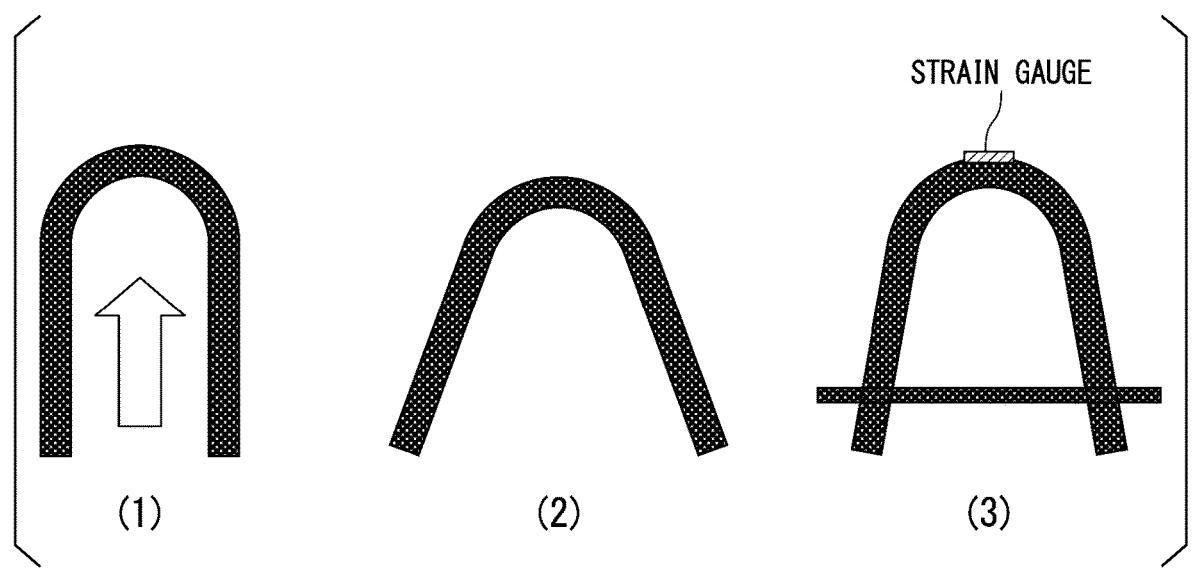

ZINC-PLATED STEEL SHEET AND MANUFACTURING METHOD THEREOF

TECHNICAL FIELD OF THE INVENTION

The present invention relates to a zinc-plated steel sheet and a manufacturing method thereof.

The present application claims priority based on Japanese Patent Application No. 2018-088417 filed in Japan on May 1, 2018, the content of which is incorporated herein by reference.

RELATED ART

In recent years, from the viewpoint of regulating greenhouse gas emission in association with global warming measures, there has been a demand for improving vehicle gas mileages, and the application of high strength steel sheets has been gradually expanding to reduce the weight of vehicle bodies and secure collision safety. Particularly, in recent years, a need for ultra-high strength steel sheets having a tensile strength of 1470 MPa or more has been intensifying. In addition, for parts in vehicle bodies that demand antirust properties, there is a demand for high strength hot-dip galvanized steel sheets having a hot-dip galvanized surface.

Such high strength hot-dip galvanized steel sheets are formed into a variety of shapes by pressing when used as steel sheets for a vehicle. However, in a case where an ultra-high strength steel sheet having a tensile strength of more than 1470 MPa is applied as a vehicle member, it is necessary to solve not only the press formability of the steel sheet, but also the hydrogen embrittlement cracking of the steel sheet.

Hydrogen embrittlement cracking refers to a phenomenon of the sudden fracture of a steel member under the exertion of a high stress while in that is caused by hydrogen that has infiltrated steel from the environment. This phenomenon is also termed delayed fracture due to the mode of the occurrence of fracture. It is known that, generally, as the tensile strength of a steel sheet increases, hydrogen embrittlement cracking of the steel sheet is more likely to occur. This is considered to be because, as the tensile strength of the steel sheet increases, the stress remaining in the steel sheet after the formation of a part increases. The susceptibility to hydrogen embrittlement cracking (delayed fracture) is called hydrogen embrittlement resistance.

Thus far, a variety of attempts have been made to improve the hydrogen embrittlement resistance of steel sheets. Studied cases of such attempts will be described below.

Patent Document 1 and Patent Document 2 describe techniques relating to an ultra-high strength cold-rolled steel sheet, in which an attempt is made to form martensite-dominant steel microstructures and to improve the hydrogen embrittlement resistance by heating a cold-rolled steel sheet having a predetermined chemical composition to the $Ac_3$ point or higher and quenching and tempering the cold-rolled steel sheet.

Patent Document 3 describes a technique relating to a high strength cold-rolled steel sheet having a tensile strength of 120 kg/mm² or higher, in which an attempt is made to improve the hydrogen embrittlement resistance by adding small amounts of Cu, Cr, Nb, Ni, and the like as the chemical composition and forming bainite-dominant steel microstructures.

Patent Document 4 describes a technique relating to a cold-rolled steel sheet having a tensile strength of 1270 MPa class or higher, in which an attempt is made to improve the bendability and the delayed fracture resistance property by carrying out decarburization annealing on the surface layer of a steel sheet having a predetermined chemical composition, then, heating the steel sheet to the $Ac_3$ point or higher, and quenching and tempering the steel sheet to turn the inside microstructure of steel into a tempered martensite-dominant microstructure and to soften the surface layer.

Patent Document 5 discloses a technique relating to a high strength cold-rolled steel sheet, in which an attempt is made to improve the hydrogen embrittlement resistance by controlling the amount and dispersive morphology of retained austenite included in the steel microstructures and using the hydrogen trap effect of the retained austenite.

In a case where a hot-dip galvanized steel sheet is manufactured with a continuous hot-dip galvanizing line, a heat treatment is carried out in a hydrogen-containing atmosphere for the purpose of reducing the surface of the steel sheet and securing wettability with the hot-dip galvanizing. At this time, hydrogen contained in the atmosphere infiltrates the steel sheet in the middle of the heat treatment.

Normally, hydrogen atoms have a sufficiently fast diffusion rate even at a room temperature, and hydrogen in steel sheets is diffused into the atmosphere within a short period of time. Therefore, in non-plated steel sheets, hydrogen that has infiltrated the steel sheets during manufacturing steps substantially creates no problem. However, in the case of a hot-dip galvanized steel sheet, since a hot-dip galvanized layer inhibits the emission of hydrogen from the steel sheet to the atmosphere, hydrogen is rarely diffused into the atmosphere at a room temperature. Therefore, the hot-dip galvanized steel sheet is subjected to processing such as blanking or pressing while containing hydrogen that has infiltrated the steel sheet during the manufacturing of the steel sheet and is used as vehicle members. In hot-dip galvanized steel sheets having a relatively low strength, hydrogen in steel substantially creates no problem, however, in hot-dip galvanized steel sheets having a tensile strength of 1470 MPa or more, there is a risk of the occurrence of hydrogen embrittlement cracking due to hydrogen in steel depending on processing conditions or stress being applied.

However, there is almost no case where an attempt is made to suppress the amount of hydrogen that has infiltrated hot-dip galvanized steel sheets from the viewpoint of suppressing hydrogen embrittlement cracking. In addition, the present inventors found that the hydrogen embrittlement resistance cannot be sufficiently improved simply by reducing the amount of hydrogen that has infiltrated hot-dip galvanized steel sheets.

Patent Document 6 describes a technique relating to a hot-dip galvanized steel sheet, in which the amount of hydrogen that has infiltrated the steel sheet is reduced by controlling the atmosphere during a heat treatment from the viewpoint of suppressing blisters. However, in Patent Document 6, the mechanical properties and hydrogen embrittlement resistance of the steel sheet are not taken into account.

Patent Document 7 describes a technique relating to a high strength galvanized steel sheet, in which the amount of diffusible hydrogen in the steel sheet of a base steel sheet is set to be 0.00008% or less (0.8 ppm or less) by mass %. However, in Patent Document 7, hydrogen embrittlement resistance is not taken into account.

PRIOR ART DOCUMENT

Patent Document

[Patent Document 1] Japanese Unexamined Patent Application, First Publication No. H10-001740

[Patent Document 2] Japanese Unexamined Patent Application, First Publication No. H9-111398

[Patent Document 3] Japanese Unexamined Patent Application, First Publication No. H6-145891

[Patent Document 4] PCT International Publication No. WO2011/105385

[Patent Document 5] Japanese Unexamined Patent Application, First Publication No. 2007-197819

[Patent Document 6] PCT International Publication No. WO2015/029404

[Patent Document 7] PCT International Publication No. WO2018/124157

DISCLOSURE OF THE INVENTION

Problems to be Solved by the Invention

As described above, thus far, attempts have been made to improve the hydrogen embrittlement resistance of hot-dip galvanized steel sheets by a variety of methods, but there have been no efforts to reduce hydrogen that has infiltrated steel sheets during the manufacturing of the steel sheets from the viewpoint of suppressing hydrogen embrittlement cracking.

The present invention has been made in consideration of the above-described circumstances, and an object of the present invention is to provide a zinc-plated steel sheet that is preferably used for vehicle members, has excellent mechanical properties, has a reduced amount of hydrogen that has infiltrated the steel sheet during the manufacturing of the steel sheet, and has excellent hydrogen embrittlement resistance and a manufacturing method thereof. In addition, another object of the present invention is to provide a zinc-plated steel sheet that has a variety of characteristics described above and further has excellent plating adhesion, which is a characteristic that is generally required for zinc-plated steel sheets, and a manufacturing method thereof. The plating adhesion refers to adhesion between a steel sheet and a hot-dip galvanized layer or a hot-dip galvannealed layer.

Means for Solving the Problem

The gist of the present invention is as described below.

[1] A zinc-plated steel sheet according to an aspect of the present invention includes a steel sheet and a zinc-plated layer disposed on a surface of the steel sheet, the steel sheet has a chemical composition containing, by mass %,
C: 0.150% to 0.500%,
Si: 0.01% to 2.50%,
Mn: 1.00% to 5.00%,
P: 0.100% or less,
S: 0.0100% or less,
Al: 0.001% to 1.000%,
N: 0.0100% or less,
O: 0.0100% or less,
Cr: 0% to 2.00%,
Mo: 0% to 1.00%,
B: 0% to 0.010%,
Cu: 0% to 1.00%,
Ni: 0% to 1.00%,
Co: 0% to 1.00%,
W: 0% to 1.00%,
Sn: 0% to 1.00%,
Sb: 0% to 0.50%,
Ti: 0% to 0.30%,
Nb: 0% to 0.30%,
V: 0% to 1.00%,
Ca: 0% to 0.0100%,
Mg: 0% to 0.0100%,
Ce: 0% to 0.000%,
Zr: 0% to 0.0100%,
La: 0% to 0.0100%,
Hf: 0% to 0.0100%,
Bi: 0% to 0.0100%, and
REM: 0% to 0.0100%
with a remainder including Fe and an impurity, steel microstructures in a range of ⅛ thickness to ⅜ thickness, having a center at ¼ thickness from the surface of the steel sheet, include, by vol %,
ferrite: 0% to 10%,
bainite: 0% to 20%,
tempered martensite: 70% or more,
fresh martensite: 0% to 10%,
retained austenite: 0% to 10%, and
pearlite: 0% to 5%, an amount of hydrogen that is emitted when the steel sheet is heated up to 200° C. from a room temperature after removal of the zinc-plated layer is 0.40 ppm or less per mass of the steel sheet, a tensile strength is 1470 MPa or more, and cracking does not occur in a U-shape bending test in which a stress equivalent to 1000 MPa is applied for 24 hours.

[2] The zinc-plated steel sheet according to [1], in which the chemical composition of the steel sheet may contain one or more selected from the group consisting of
Cr: 0.001% to 2.00%,
Mo: 0.001% to 1.00%,
B: 0.0001% to 0.010%,
Cu: 0.001% to 1.00%,
Ni: 0.001% to 1.00%,
Co: 0.001% to 1.00%,
W: 0.001% to 1.00%,
Sn: 0.001% to 1.00%, and
Sb: 0.001% to 0.50%.

[3] The zinc-plated steel sheet according to [1] or [2], in which the chemical composition of the steel sheet may contain one or more selected from the group consisting of
Ti: 0.001% to 0.30%,
Nb: 0.001% to 0.30%, and
V: 0.001% to 1.00%.

[4] The zinc-plated steel sheet according to any one of [1] to [3], in which the chemical composition of the steel sheet may contain one or more selected from the group consisting of
Ca: 0.0001% to 0.0100%,
Mg: 0.0001% to 0.0100%,
Ce: 0.0001% to 0.0100%,
Zr: 0.0001% to 0.0100%,
La: 0.0001% to 0.0100%,
Hf: 0.0001% to 0.0100%,
Bi: 0.0001% to 0.0100%, and
REM: 0,0001% to 0.0100%.

[5] The zinc-plated steel sheet according to any one of the above [1] to [4], in which a ductile-brittle transition temperature may be −40° C. or lower.

[6] A manufacturing method of a zinc-plated steel sheet according to another aspect of the present invention is a manufacturing method of the zinc-plated steel sheet according to any one of [1] to [5], in which each step of (I) to (IV) is sequentially carried out on the steel sheet having the chemical composition according to any one of [1] to [4]:

(I) an annealing step of annealing the steel sheet under conditions of a heating temperature: an $Ac_3$ point to 950° C. and a retention time in a temperature range of the $Ac_3$ point to 950° C.: 1 to 500 s and maintaining a concentration of hydrogen in a furnace at 1.0 to 15.0 vol % at all times from when a steel sheet temperature reaches 600° C. until when retention of the steel sheet in the temperature range of the $Ac_3$ point to 950° C. ends;

(II) a first retention step of retaining the steel sheet in a temperature range of an Ms point to 600° C. for 20 to 500 s and maintaining the concentration of hydrogen in the furnace at 1.0 to 10.0 vol % at all times during the retention of the steel sheet;

(II) a plating step of immersing the steel sheet in a hot-dip galvanizing bath and then cooling the steel sheet until the steel sheet temperature reaches lower than the Ms point −150° C.; and (IV) a second retention step of retaining the steel sheet in an atmosphere having a concentration of hydrogen of less than 0.50 vol % in a temperature range of 200° C. or higher and lower than 350° C. for 10 to 1000 s and then coiling the steel sheet in a coil shape.

[7] The manufacturing method of the zinc-plated steel sheet according to [6], in which the step (III) may be a step in which, after immersion of the steel sheet in the hot-dip galvanizing bath, an alloying treatment is carried out in a temperature range of 460° C. to 600° C., and then the steel sheet is cooled until the steel sheet temperature reaches lower than the Ms point −150° C.

Effects of the Invention

According to the above-described aspects of the present invention, it is possible to provide a zinc-plated steel sheet that is preferably used as vehicle members, has excellent mechanical properties, has a reduced amount of hydrogen that has infiltrated the steel sheet during the manufacturing of the steel sheet, and is excellent in terms of the hydrogen embrittlement resistance and the plating adhesion and a manufacturing method thereof. According to preferred aspects of the present invention, it is possible to provide a zinc-plated steel sheet that has a variety of characteristics described above and further has excellent low temperature toughness and a manufacturing method thereof.

BRIEF DESCRIPTION OF THE DRAWING

FIG. 1 is a schematic diagram showing a U-shape bending test method of a steel sheet.

EMBODIMENTS OF THE INVENTION

A zinc-plated steel sheet according to the present embodiment includes a steel sheet and a zinc-plated layer disposed on a surface of the steel sheet. It should be noted that, in the present embodiment, the zinc-plated steel sheet refers to a hot-dip galvanized steel sheet or a galvannealed steel sheet, and the zinc-plated layer refers to a hot-dip galvanized layer or a hot-dip galvannealed layer. In addition, in the present embodiment, the steel sheet refers to a base steel sheet having a zinc-plated layer disposed on a surface.

The steel sheet according to the present embodiment has a chemical composition containing, by mass %. C: 0.150% to 0.500%, Si: 0.01% to 2.50%, Mn: 1.00% to 5.00%, P: 0.100% or less, S: 0.0100% or less, Al: 0.001% to 1.000%, N: 0.0100% or less, O: 0.0100% or less, Cr: 0% to 2.00%, Mo: 0% to 1.00%, B: 0% to 0.010%, Cu: 0% to 1.00%, Ni: 0% to 1.00%, Co: 0% to 1.00%, W: 0% to 1.00%, Sn: 0% to 1.00%, Sb: 0% to 0.50%, Ti: 0% to 0.30%, Nb: 0% to 0.30%, V: 0% to 1.00%, Ca: 0% to 0.0100%, Mg: 0% to 0.0100%, Ce: 0% to 0.0100%, Zr: 0% to 0.0100%%, La: 0% to 0.0100%, Hf: 0% to 0.0100%, Bi: 0% to 0.0100%, and REM: 0% to 0.0100% with a remainder including Fe and an impurity.

In the steel sheet according to the present embodiment, steel microstructures in a range of ⅛ thickness to ⅜ thickness, having a center at ¼ thickness from the surface of the steel sheet, include, by vol %, ferrite: 0% to 10%, bainite: 0% to 20%, tempered martensite: 70% or more, fresh martensite: 0% to 10%, retained austenite: 0% to 10%, and pearlite: 0% to 5%.

In the zinc-plated steel sheet according to the present embodiment, the amount of hydrogen that is emitted when the steel sheet is heated up to 200° C. from a room temperature after the removal of the zinc-plated layer is 0.40 ppm or less per mass of the steel sheet.

In the zinc-plated steel sheet according to the present embodiment, the tensile strength is 1470 MPa or more, and cracking does not occur in a U-shape bending test in which a stress equivalent to 1000 MPa is applied for 24 hours.

In the zinc-plated steel sheet according to the present embodiment, the chemical composition of the steel sheet may contain one or more selected from the group consisting of Cr 0.001% to 2.00%, Mo: 0.001% to 1.00%, B: 0.0001% to 0.010%, Cu: 0.001% to 1.00%, Ni: 0.001% to 1.00%, Co: 0.001% to 1.00%, W: 0.001% to 1.00%, Sn: 0.001% to 1.00%, and Sb: 0.001% to 0.50%.

In the zinc-plated steel sheet according to the present embodiment, the chemical composition of the steel sheet may contain one or more selected from the group consisting of T: 0.001% to 0.30%, Nb: 0.001% to 0.30%, and V: 0.001% to 1.00%.

In the zinc-plated steel sheet according to the present embodiment, the chemical composition of the steel sheet may contain one or more selected from the group consisting of Ca: 0.0001% to 0.0100%, Mg: 0.0001% to 0.0100%, Ce: 0.0001% to 0.0100%, Zr: 0.0001% to 0.0100%, La: 0.0001% to 0.0100%, Hf: 0.0001% to 0.0100%, Bi: 0.0001% to 0.0100%, and REM: 0.0001% to 0.0100%.

Hereinafter, the zinc-plated steel sheet according to the present embodiment will be described in detail.

"Chemical Composition"

First, the reasons for limiting the chemical composition of the steel sheet according to the present embodiment as described above will be described. It should be noted that, in the present specification, '%' that defines the chemical composition is 'mass %' unless particularly otherwise described. Numerical limiting ranges described below includes the lower limits and the upper limits in the ranges. Numerical values expressed with 'more than' and 'less than' are not included in numerical ranges.

[C: 0.150% to 0.500%]

Carbon (C) is an essential element for obtaining a desired strength of the zinc-plated steel sheet. When the C content is less than 0.150%, the desired high strength cannot be obtained. Therefore, the C content is set to be 0.150% or more. The C content is preferably 0.180% or more or 0.190% or more. On the other hand, when the C content exceeds 0.500%, the weldability degrades. Therefore, the C content is set to be 0.500% or less. From the viewpoint of suppressing the degradation of the weldability of the zinc-plated steel sheet, the C content is preferably 0.350% or less.

[Si: 0.01% to 2.50%]

Silicon (Si) is an element that suppresses the generation of iron carbide and contributes to an improvement in the strength and formability of the zinc-plated steel sheet. In order to obtain desired strength and desired formability, the Si content is set to be 0.01% or more. The Si content is preferably 0.05% or more or 0.10% or more. On the other hand, when Si is excessively contained, the weldability of the zinc-plated steel sheet deteriorates. Therefore, the Si content is set to be 2.50% or less. The Si content is preferably 2.00% or less, 1.20% or less, or 1.00% or less.

[Mn: 1.00% to 5.00%]

Manganese (Mn) is a strong austenite-stabilizing element and is an effective element for the high-strengthening of zinc-plated steel sheet. In order to obtain a desired strength, the Mn content is set to be 1.00% or more. The Mn content is preferably 1.50% or more or 2.00% or more. On the other hand, when Mn is excessively contained, the weldability and low temperature toughness of the zinc-plated steel sheet deteriorate. Therefore, the Mn content is set to be 5.00% or less. The Mn content is preferably 4.00% or less or 3.50% or less.

[P: 0.100% or less]

Phosphorus (P) is a solid solution strengthening element and is an effective element for the high-strengthening of the zinc-plated steel sheet. However, when phosphorus is excessively contained, the weldability and toughness of the zinc-plated steel sheet deteriorate. Therefore, the P content is limited to 0.100% or less. The P content is preferably 0.050% or less and more preferably 0.020% or less. However, an extreme decrease in the P content increases the dephosphorization cost. Therefore, from the viewpoint of the economic efficiency, the P content is preferably set to 0.001% or more or 0.005% or more.

[S: 0.0100% or less]

Sulfur (S) is an element which is contained as an impurity and forms MnS in steel, deteriorating the toughness and hole expansibility of the zinc-plated steel sheet. Therefore, in order to prevent the significant deterioration of the toughness and hole expansibility of the zinc-plated steel sheet, the S content is limited to 0.0100% or less. The S content is preferably 0.0050% or less or 0.0035% or less. However, an extreme decrease in the S content increases the desulfurization cost. Therefore, from the viewpoint of the economic efficiency, the S content is preferably set to 0.0005% or more or 0.0010% or more.

[Al: 0.001% to 1.000%]

The Aluminum (Al) content is at least 0.001% or more in order for the deoxidation of steel. The Al content is preferably 0.005% or more or 0.015% or more. However, even when Al is excessively contained, the above-described effect is saturated, and the cost is increased. In addition, the transformation temperature of steel is increased, which increases a load during hot rolling. Therefore, the Al content is set to be 1.000% or less. The Al content is preferably 0.500% or less or 0.400% or less.

[N: 0.0100% or less]

Nitrogen (N) is an element which is contained in steel as an impurity. When the N content exceeds 0.0100%, coarse nitride is formed in steel, and the bendability and hole expansibility of the zinc-plated steel sheet are deteriorated. Therefore, the N content is limited to 0.0100% or less. The N content is preferably 0.0050% or less or 0.0045% or less. However, an extreme decrease in the N content increases the denitrogenation cost. Therefore, from the viewpoint of economic efficiency, the N content is preferably set to 0.0005% or more or 0.0020% or more.

[O: 0.0100% or less]

Oxygen (O) is an element which is contained in steel as an impurity. When the O content exceeds 0.0100%, coarse oxide is formed in steel, and the bendability and hole expansibility of the zinc-plated steel sheet are deteriorated. Therefore, the O content is limited to 0.0100% or less. The O content is preferably 0.0050% or less or 0.0030% or less. However, from the viewpoint of the manufacturing cost, the O content is preferably 0.0001% or more, 0.0005% or more, or 0.0010% or more.

[Amount of hydrogen that is emitted when steel sheet is heated up to 200° C. from a room temperature after removal of zinc-plated layer: 0.40 ppm or less per mass of steel sheet]

In order to prevent the hydrogen embrittlement cracking resistance of the zinc-plated steel sheet, the amount of hydrogen that is emitted when the steel sheet is heated up to 200° C. from a room temperature is set to be 0.40 ppm or less per mass of the steel sheet. The smaller the amount of hydrogen that is emitted, the better, and the amount of hydrogen is preferably 0.30 ppm or less and more preferably 0.20 ppm or less. Hydrogen that affects hydrogen embrittlement is hydrogen that is emitted in a case where the steel sheet is heated at a relatively low temperature, and hydrogen that is emitted by heating the steel sheet at a relatively high temperature does not affect hydrogen embrittlement. In the present embodiment, the amount of hydrogen that is emitted when the steel sheet is heated up to 200° C. from a room temperature is regarded as one of the elements affecting hydrogen embrittlement cracking, and the amount of hydrogen is limited to 0.40 ppm or less. The range of a room temperature is 15° C. to 25° C.

The amount of hydrogen that is emitted when the steel sheet is heated up to 200° C. from a room temperature is measured by the following method. First, in order to remove the zinc-plated layer (hot-dip galvanized layer or hot-dip galvannealed layer) of the zinc-plated steel sheet, the front and rear surfaces of the zinc-plated steel sheet are each mechanically ground by 0.1 mm. After that, the cumulative amount (measurement value of gas chromatograph) of the masses of hydrogen emitted from the steel sheet when the steel sheet is heated up to 200° C. from a room temperature is obtained by a temperature rising hydrogen analysis method using a gas chromatograph (temperature rising rate: 100° C./hour, measured up to 300° C.). The obtained cumulative amount (measurement value by gas chromatograph) of the masses of hydrogen is divided by the mass of the steel sheet after the removal of the zinc-plated layer that has been subjected to the measurement, thereby obtaining the amount of hydrogen (mass ppm) that is emitted when the steel sheet is heated up to 200° C. from a room temperature. The mass of the steel sheet that is subjected to the measurement (the steel sheet after the removal of the zinc-plated layer) is desirably set to at least 0.5 g or more and preferably 1.0 g or more. It should be noted that, in order to prevent the diffusion of hydrogen into the atmosphere before the measurement, it is necessary to start the analysis within one hour from the removal of the zinc-plated layer. Alternatively, after the removal of the zinc-plated layer, the steel sheet is supposed to be stored in liquid nitrogen until the start of the analysis.

The steel sheet according to the present embodiment has the above-described chemical composition, and the remainder includes Fe and an impurity. The 'impurity' is a component that is mixed into the steel sheet during the industrial manufacturing of the steel sheet due to a variety of causes such as raw materials such as ores and scraps and manufacturing steps.

The steel sheet according to the present embodiment may contain the following optional elements as necessary in place of some of Fe in the remainder. However, since the zinc-plated steel sheet according to the present embodiment is capable of achieving the object even when the optional elements described below are not added to the steel sheet, the lower limit of the amount of each optional element is 0% in a case where the optional element is not added to the steel sheet.

[One or more selected from the group consisting of Cr: 0% to 2.00%, Mo: 0% to 1.00%, B: 0% to 0.010%, Ni: 0% to 1.00%, Cu: 0% to 1.00%, Co: 0% to 1.00%, W: 0% to 1.00%, Sn: 0% to 1.00%, and Sb: 0% to 0.50%]

Chromium (Cr), molybdenum (Mo), boron (B), nickel (Ni), copper (Cu), cobalt (Co), tungsten (W), tin (Sn), and antimony (Sb) are all effective elements for the high-strengthening of the zinc-plated steel sheet and are thus contained as necessary. However, when the above-described elements are excessively contained, the above-described effect is saturated, and the cost is increased. Therefore, the amounts of the above-described elements are set to Cr: 0% to 2.00%, Mo: 0% to 1.00%, B: 0% to 0.010%, Ni: 0% to 1.00%, Cu: 0% to 1.00%, Co: 0% to 1.00%, W: 0% to 1.00%, Sn: 0% to 1.00%, and Sb: 0% to 0.50%. In order to further improve the strength of the zinc-plated steel sheet, it is preferable to set the amount of at least one of Cr, Mo, Ni, Cu, Co, W, Sn, and Sb to 0.001% or more or set the B content to 0.0001% or more.

[One or more selected from the group consisting of Ti: 0% to 0.30%, Nb: 0% to 0.30%, and V: 0% to 1.00%]

Titanium (Ti), niobium (Nb), and vanadium (V) are all carbide-forming elements and effective elements for the high-strengthening of the zinc-plated steel sheet and thus may be contained as necessary. However, even when the above-described elements are excessively contained, the above-described effect is saturated, and the cost is increased. Therefore, the amounts of the above-described elements (Ti, Nb, and V) are respectively set to 0% to 0.30%, 0% to 0.30%, and 0% to 1.00%. In order to further improve the strength of the zinc-plated steel sheet, the amount of at least one of the above-described elements is preferably set to 0.001% or more.

[One or more from group consisting of Ca: 0% to 0.0100%, Mg: 0% to 0.0100%, Ce: 0% to 0.0100%, Zr: 0% to 0.0100%, La: 0% to 0.0100%, Hf: 0% to 0.0100%, Bi: 0% to 0.0100%, and REM: 0% to 0.0100%]

Calcium (Ca), magnesium (Mg), cerium (Ce), zirconium (Zr), lanthanum (La), hafnium (Hf), and REM are elements that contribute to the fine dispersion of an inclusion in steel. Bismuth (Bi) is an element that reduces micro-segregation of a substitutional alloying element such as Mn or Si in steel.

Since Ca, Mg. Ce. Zr. La, Hf, Bi, and REM each contribute to an improvement in the workability of the steel sheet, these elements are preferably contained as necessary. In order to obtain an effect of workability improvement, it is necessary to set the amount of at least one of the above-described elements to more than 0%. The content is preferably 0.0001% or more. On the other hand, when at least one of the above-described elements is excessively contained, the ductility of the zinc-plated steel sheet deteriorates. Therefore, the amounts of the above-described elements are each set to 0.0100% or less.

REM in the present embodiment denotes rare earth elements having atomic numbers of 59 to 71, and the amount of REM is the total amounts of these elements. In a case where two or more rare earth elements are contained, the rare earth elements may be contained by adding misch metal.

The steel sheet according to the present embodiment includes Fe and the impurity in addition to the above-described elements, but may contain elements other than the respective elements described above as long as the effect of the present invention is not impaired.

"Steel Microstructures"

Next, the reasons for limiting the steel microstructures of the steel sheet according to the present embodiment will be described. '%' that defines the steel microstructures is all 'vol %' unless particularly otherwise described. It should be noted that the steel microstructures described below are steel microstructures present in a range of ⅛ thickness to ⅜ thickness, having the center at ¼ thickness from the surface of the steel sheet. The reason for defining the steel microstructures in this range is that the steel microstructures in this range represent the steel microstructures of the entire steel sheet.

[Ferrite: 0% to 10%]

Ferrite is a microstructure that is soft, but excellent in terms of ductility. As the volume percent of ferrite increases, the elongation of the zinc-plated steel sheet further improves, but the strength further decreases. Therefore, the volume percent of ferrite is set to be 0% to 10%. The volume percent of ferrite is preferably 0% to 8% and more preferably 0% to 5%. Since the zinc-plated steel sheet according to the present embodiment is capable of achieving the object even when the steel sheet does not include ferrite, the volume percent of ferrite may be 0%.

[Retained austenite: 0% to 10%]

Retained austenite improves the machining hardening property of the zinc-plated steel sheet by a TRIP effect, by which retained austenite transforms into martensite due to process-induced transformation occurring in the middle of the distortion of the steel sheet. Since the zinc-plated steel sheet according to the present embodiment is capable of achieving the object even when the steel sheet does not include retained austenite, the volume percent of retained austenite may be 0%. In order to further improve the strength after forming by improving the machining hardening property, the volume percent of retained austenite may be set to 3% or more or 4% or more. On the other hand, martensite transformed by process-induced transformation is extremely hard and thus deteriorates local ductility such as hole expansibility of the zinc-plated steel sheet. Therefore, the volume percent of retained austenite is set to be 10% or less. The volume percent of retained austenite is preferably 7% or less or 6% or less.

[Pearlite: 0% to 5%]

Since pearlite includes hard and coarse cementite and serves as a starting point of fracture during plastic deformation, pearlite deteriorates the local ductility of the zinc-plated steel sheet. Therefore, the volume percent of pearlite is set to be 5% or less. The volume percent of pearlite is preferably 4% or less. Since the zinc-plated steel sheet according to the present embodiment is capable of achieving the object even when the steel sheet does not include pearlite, the volume percent of pearlite may be 0%, but may also be set to 1% or more.

[Bainite: 0% to 20%]

Bainite is a microstructure that is generated in an intermediate temperature range between the ferritic transformation temperature and the martensitic transformation temperature and has an intermediate characteristic between ferrite and fresh martensite. Since bainite has a higher strength than ferrite, but a lower strength than fresh martensite, when bainite is excessively generated, it becomes impossible to obtain a desired strength. Therefore, the volume percent of bainite is set to be 20% or less. The volume percent of bainite is preferably 10% or less. Since the zinc-plated steel sheet according to the present embodiment is capable of achieving the object even when the steel sheet does not include bainite, the volume percent of bainite may be 0%. From the viewpoint of securing the strength and the ductility, the volume percent of bainite may be set to 5% or more or 7% or more.

[Fresh martensite: 0% to 10%]

Fresh martensite has a high strength and is thus an effective microstructure for securing the strength. However, fresh martensite is also a brittle microstructure and thus serves as a starting point of fracture during plastic deformation and deteriorates the local ductility, such as hole expansibility, of the zinc-plated steel sheet. Therefore, the volume percent of fresh martensite is set to be 10% or less. The volume percent of fresh martensite is preferably 8% or less. Since the zinc-plated steel sheet according to the present embodiment is capable of achieving the object even when the steel sheet does not include fresh martensite, the volume percent of fresh martensite may be 0%, but may be set to 1% or more or 2% or more from the viewpoint of securing the strength.

[Tempered martensite: 70% or more]

Tempered martensite is a microstructure that satisfies both the high strength and the high toughness of the zinc-plated steel sheet. The steel sheet according to the present embodiment mainly includes tempered martensite. The volume percent of tempered martensite is set to be 70% or more. The volume percent of tempered martensite is preferably 75% or more, 80% or more, or 85% or more. Tempered martensite may be 100%, but tempered martensite may be set to 95% or less or 90% or less. Tempered martensite is generated by the tempering of some of fresh martensite in a second retention step described below.

The total volume percentage of ferrite, retained austenite, pearlite, bainite, fresh martensite, and tempered martensite is 100%. In the present embodiment, an inclusion and a precipitate are considered to be not included in the steel microstructures.

The calculation method of the volume percentage of the steel microstructures of the steel sheet according to the present embodiment is as described below.

The volume percentage of retained austenite is measured by an X-ray diffraction method. First, a test piece is collected from a soaking region of the zinc-plated steel sheet. The soaking region refers to a region that has been sufficiently heat-treated. In a region that is not sufficiently heat-treated, there is a case where the metallographic structure of the steel sheet according to the present embodiment is not present. The collected test piece is chemically polished using hydrofluoric acid and a hydrogen peroxide solution to expose a surface parallel to the sheet surface such that a range of ⅛ thickness to ⅜ thickness, having the center at ¼ thickness from the surface of the sheet thickness can be observed, and furthermore, the surface is finished to a mirror surface and is used as a measurement surface. As the X-ray diffractometer, RINT2000 manufactured by Rigaku Corporation is used, and, as the light source, a Co-K$\alpha_1$ ray is used. Measurement is carried out in a scanning range that is set to be a range of 45° to 105° in terms of 2θ. The area ratio of the X-ray diffraction pattern of a steel microstructure found to have an fcc crystal structure by the X-ray diffraction method (retained austenite) is measured, and the area ratio is regarded as the volume percentage of retained austenite.

Regarding the volume percentages of ferrite, tempered martensite, fresh martensite, pearlite, and bainite, a cross section in the sheet thickness direction orthogonal to a rolling direction of the steel sheet is cut out and mirror-polished, the steel microstructures are exposed with a Nital solution, and a secondary electron image is captured using a field-emission-type scanning electron microscope. The observation position is set to be the range of ⅛ thickness to ⅜ thickness, having the center at ¼ thickness from the surface of the sheet thickness, and an area of 6000 μm$^2$ in total is observed at a plurality of visual fields (image-capturing magnification: 3000 times). From the obtained microstructure photograph, the fraction of each microstructure is calculated by the point counting method. First, an equal-interval lattice is drawn on the microstructure photograph. Next, which of ferrite, tempered martensite, fresh martensite or retained austenite, pearlite, or bainite a microstructure at each lattice point corresponds to is determined. The number of lattice points at which a microstructure corresponding to each microstructure is present is obtained and divided by the total number of the lattice points, whereby the fraction of each microstructure can be measured. The larger the total number of lattice points, the more accurately the volume percentage can be obtained. In the present embodiment, the lattice interval is set to be 2 μm×2 μm, and the total number of lattice points is set to be 1500 points. It should be noted that, since the steel microstructure of the steel sheet according to the present embodiment is an isotropic microstructure, the fraction of each microstructure obtained by the point counting method of the cross section can be regarded as the volume percentage.

A region in which a sub-microstructure (lath boundary or block boundary) is present in the grain and carbide is precipitated in a plurality of variant forms is determined as tempered martensite. In addition, a region in which cementite is precipitated in a lamella shape is determined as pearlite. A region in which the brightness is low and no sub-microstructure is observed is determined as ferrite. A region in which the brightness is high and a sub-microstructure is not exposed by etching is determined as fresh martensite or retained austenite. A region that does not correspond to any of the above-described microstructures is determined as bainite. The volume percentage of fresh martensite can be obtained by subtracting the volume percentage of retained austenite obtained by the X-ray diffraction method from the volume percentage of fresh martensite and retained austenite obtained by the point counting method.

"Mechanical Properties"

[Tensile strength of 1470 MPa or more]

The tensile strength of the zinc-plated steel sheet according to the present embodiment is set to be 1470 MPa or more. The tensile strength is measured by collecting a JIS No. 5 tensile test piece having a longitudinal direction in a direction perpendicular to the rolling direction and carrying out a tensile test in accordance with JIS Z 2241:2011. The cross-head rate is set to be 2 mm/min for 2% or smaller strain and is set to be 20 mm/min for strain of larger than 2%.

[Cracking does not occur in U-shape bending test in which stress equivalent to 1000 MPa is applied for 24 hours]

The present inventors found that, even in a case where the amount of hydrogen that has infiltrated the steel sheet is reduced, that is, a case where the amount of hydrogen that is emitted when the steel sheet is heated up to 200° C. from a room temperature after the removal of the zinc-plated layer is set to be 0.40 ppm or less per mass of the steel sheet, the hydrogen embrittlement resistance does not necessarily improves. The present inventors found that, when the second retention step described below is carried out, it is possible to reduce the amount of hydrogen in the steel sheet and, furthermore, to improve the hydrogen embrittlement resistance.

In the present embodiment, the hydrogen embrittlement resistance being excellent indicates that cracking does not occur in a U-shape bending test in which a stress equivalent to 1000 MPa is applied for 24 hours. The U-shape bending test will be described with reference to FIG. 1.

First, from the soaking region of the zinc-plated steel sheet, a 30 mm×120 mm strip test piece is collected such that the longitudinal direction of the test piece and the rolling direction of the steel sheet become perpendicular to each other. On both ends of the strip test piece, holes for bolt fastening are opened. Next, the strip test piece is bent 180° with a punch having a radius of 10 mm ((1) in FIG. 1). After that, the U-shape bent test piece that has sprung back ((2) in FIG. 1) is fastened using a bolt and a nut to apply a stress ((3) in FIG. 1). At this time, a GL 5 mm strain gauge is attached to the top of the U-shape bent test piece, and a stress equivalent to 1000 MPa is applied by controlling the strain amount. At this time, the strain is converted to stress from a stress-strain curve obtained by a tensile test carried out in advance. It should be noted that the end surface of the U-shape bent test piece is left as shear-cut. After 24 hours from the application of the stress, the presence or absence of cracking is visually observed. The test temperature is set to be a room temperature. The range of a room temperature is 15° C. to 25° C., and, in a case where the temperature of the testing room is not in this range, the temperature is adjusted to the range of 15° C. to 25° C.

In the U-shape bending test, a stress equivalent to 1200 MPa may be applied, and, when cracking does not occur even in this case, the hydrogen embrittlement resistance is excellent, which is preferable.

The ductile-brittle transition temperature (Trs) of the zinc-plated steel sheet according to the present embodiment is preferably −40° C. or lower. When the ductile-brittle transition temperature is −40° C. or lower, the low temperature toughness is excellent, which is preferable.

The ductile-brittle transition temperature is measured by the Charpy impact test. A Charpy test piece that is to be used in the Charpy impact test is collected such that the longitudinal direction of the test piece becomes parallel to the rolling direction of the zinc-plated steel sheet, and a V notch is introduced in the sheet width direction. In addition, as the Charpy test piece, a plurality of the zinc-plated steel sheets is stacked and fastened with a bolt in order to avoid out-of-plane distortion, the fact that there is no gap between the zinc-plated steel sheets is confirmed, and then a test piece provided with a 2 mm-deep V notch is produced. The number of the zinc-plated steel sheets that are stacked is set such that the thickness of the test piece after stacking becomes closest to 10 mm. For example, in a case where the sheet thickness is 1.6 mm, six sheets are stacked such that the thickness of the test piece reaches 9.6 mm. The ductile-brittle transition temperature is measured at testing temperatures in a range of −40° C. to 60° C. at 20° C. intervals. The maximum temperature at which the absorbed energy is below ½ of the upper shelf absorbed energy is regarded as Trs. Conditions other than the above-described conditions are based on JIS Z 2242:2005.

"Zinc-Plated Layer"

The zinc-plated layer needs to be a plated layer mainly containing zinc and may contain a chemical composition other than zinc. In the plated layer mainly containing zinc, the element constituting the plated layer needs to be Zn, and, as the remainder except for Zn, for example, Al, Mg, Si, Mn, Fe, Ni, Cu, Sn, Sb, Pb, Cr, Ti, and the like may be contained in the plated layer. In addition, the zinc-plated layer may be a hot-dip galvanized layer or a hot-dip galvannealed layer obtained by alloying the hot-dip galvanized layer.

In a case where the zinc-plated layer is a hot-dip galvanized layer, the iron content in the hot-dip galvanized layer is preferably less than 7.0 mass %.

In a case where the zinc-plated layer is a hot-dip galvannealed layer, the iron content in the hot-dip galvannealed layer is preferably 6.0 mass % or more. In a case where a hot-dip galvannealed layer is used as the zinc-plated layer, it is possible to improve the weldability more than a case where a hot-dip galvanized layer is used as the zinc-plated layer.

The plating adhesion amount of the zinc-plated layer is not particularly limited, but is preferably 5 g/m$^2$ or more and more preferably in a range of 25 to 75 g/m$^2$ per single surface from the viewpoint of the corrosion resistance.

Next, the manufacturing method of the zinc-plated steel sheet according to the present embodiment will be described. The zinc-plated steel sheet according to the present embodiment is manufactured by carrying out hot rolling on a cast piece that has been cast, then, further carrying out cold rolling on the cast piece to manufacture a steel sheet having the above-described chemical composition, and then forming a zinc-plated layer on a surface of the steel sheet with a continuous hot-dip galvanizing line.

In the manufacturing method of the zinc-plated steel sheet according to the present embodiment, hot-band annealing may be carried out between hot rolling and cold rolling. In addition, pickling may also be carried out.

The steel sheet that has been hot-rolled may be directly introduced to the continuous hot-dip galvanizing line without carrying out cold rolling. In a case where cold rolling is not carried out, hot-band annealing or pickling may or may not be carried out.

Furthermore, in a plating step, an alloying treatment may or may not be carried out.

In the continuous hot-dip galvanizing line, an annealing step, a first retention step, a plating step, and a second retention step are sequentially carried out. It should be noted that, in the following description, temperatures are all the surface temperature of the steel sheet (steel sheet temperature) and need to be measured with a radiation-type thermometer or the like.

In the annealing step, annealing is carried out under conditions of a heating temperature: the $Ac_3$ point to 950° C. and a retention time in the temperature range of the $Ac_3$ point to 950° C.: 1 to 500 s. In addition, in the annealing step, the concentration of hydrogen in a furnace is maintained at 1.0 to 15.0 vol % at all times from when the steel sheet temperature reaches 600° C. until when the retention of the steel sheet in the temperature range of the $Ac_3$ point to 950° C. ends.

In the first retention step, the steel sheet is retained in a temperature range of the Ms point to 600° C. for 20 to 500 s. During the retention of the steel sheet, the concentration of hydrogen in the furnace is maintained at 1.0 to 10.0 vol % at all times.

In the plating step, the steel sheet is immersed in a hot-dip galvanizing bath and then cooled until the steel sheet temperature reaches lower than the Ms point −150° C. In addition, after the immersion of the steel sheet in the hot-dip galvanizing bath, an alloying treatment may be carried out in a temperature range of 460° C. to 600° C., and then the steel sheet may be cooled until the steel sheet temperature reaches lower than the Ms point −150° C.

In the second retention step, the steel sheet is retained in an atmosphere having a concentration of hydrogen of less than 0.50 vol % in a temperature range of 200° C. or higher and lower than 350° C. for 10 to 1000 s and is then coiled in a coil shape.

As the $Ac_3$ point and the Ms point, values calculated by the following formulae are used. [Element symbol] in each formula indicates the amount of each element by mass %. In a case where an element is not contained, a value of 0% is substituted.

$$Ac_3(° C.)=912-230.5\times[C]+31.6\times[Si]-20.4\times[Mn]-39.8\times[Cu]-18.1\times[Ni]-14.8\times[Cr]+16.8\times[Mo]+100.0\times[Al]$$

$$Ms(° C.)=550-361\times[C]-39\times[Mn]-35\times[V]-20\times[Cr]-17\times[Ni]-10\times[Cu]-5\times[Mo]+30\times[Al]$$

Hereinafter, each step will be described in detail.

(I) Annealing Step

[Annealing under conditions of heating temperature: $Ac_3$ point to 950° C. and retention time in temperature range of $Ac_3$ point to 950° C.: 1 to 500 s]

Annealing is carried out on the cold-rolled steel sheet or the steel sheet that has been hot-rolled and then once cooled to a room temperature. It should be noted that 'annealing' mentioned herein refers to a step of heating the steel sheet up to the $Ac_3$ point or higher, retaining the steel sheet in a temperature range of the $Ac_3$ point to 950° C., and then cooling the steel sheet to the $Ac_3$ point or lower. In order to cause austenitizing to sufficiently proceed, the heating temperature during annealing is set to be the $Ac_3$ point or higher. The heating temperature is preferably the $Ac_3$ point+20° C. or higher. When the heating temperature during annealing is excessively increased, not only does the toughness deteriorate due to the coarsening of the austenite grain sizes, but annealing facilities are also damaged. Therefore, the heating temperature during annealing is set to be 950° C. or lower. The heating temperature is preferably 900° C. or lower.

When the retention time (annealing time) in the temperature range of the $Ac_3$ point to 950° C. is short, austenitizing does not proceed sufficiently. Therefore, the retention time in the temperature range of the $Ac_3$ point to 950° C. is set to be 1 s or longer. The retention time is preferably 30 s or longer or 50 s or longer. On the other hand, when the retention time in the temperature range of the $Ac_3$ point to 950° C. is too long, the productivity is impaired. Therefore, the retention time in the temperature range of the $Ac_3$ point to 950° C. is set to be 500 s or shorter.

During annealing, the steel sheet temperature may be fluctuated in the temperature range of the $Ac_3$ point to 950° C. or the steel sheet temperature may be kept constant in the temperature range of the $Ac_3$ point to 950° C.

[Concentration of hydrogen in furnace being 1.0 to 15.0 vol % at all times from when steel sheet temperature reaches 600° C. until when retention of steel sheet in temperature range of $Ac_3$ point to 950° C. ends]

In order to secure the wettability between the steel sheet and hot-dip galvanizing, the concentration of hydrogen in the furnace is maintained at 1.0 vol % or more at all times from when the steel sheet temperature reaches 600° C. until when the retention of the steel sheet in the temperature range of the $Ac_3$ point to 950° C. ends. In other words, while the steel sheet temperature is increased up to the heating temperature of the $Ac_3$ point to 950° C. from 600° C. and retained at the $Ac_3$ point to 950° C., the concentration of hydrogen in the furnace is maintained at 1.0 vol % or more at all times. That is to say, while the steel sheet is heated in the furnace such that the steel sheet temperature reaches 600° C., then, the steel sheet is heated up to the temperature range of the $Ac_3$ point to 950° C. and retained at the temperature range of the $Ac_3$ point to 950° C. for 1 to 500 s, and the steel sheet is removed from the furnace, the concentration of hydrogen in the furnace is maintained at 1.0 vol % or more at all times. The concentration of hydrogen in the furnace is preferably 2.0 vol % or more. Meanwhile, when the concentration of hydrogen is too high, since the amount of hydrogen that infiltrates the steel sheet increases, and the risk of hydrogen embrittlement cracking increases, the concentration of hydrogen in the furnace is set to be 15.0 vol % or less. The concentration of hydrogen in the furnace is preferably 10.0 vol % or less or 5.0 vol % or less.

The average heating rate until the steel sheet temperature reaches the $Ac_3$ point does not need to be particularly limited, but is desirably 0.5 to 10° C./s. When the average heating rate is below 0.5° C./s, since austenite coarsens, there is a case where the steel microstructure that is finally obtained becomes coarse. When the average heating rate exceeds 10° C./s, recrystallization of ferrite does not proceed sufficiently, and there is a case where the elongation of the zinc-plated steel sheet deteriorates. It should be noted that the average heating rate is a value obtained by dividing the temperature difference between the steel sheet temperature at the time of introducing the steel sheet to the annealing furnace (a furnace in which the steel sheet is retained in the temperature range of the $Ac_3$ point to 950° C.) and the $Ac_3$ point by the time difference taken from when the steel sheet is introduced to the annealing furnace until when the steel sheet temperature reaches the $Ac_3$ point.

(II) First Retention Step

[Retaining steel sheet in temperature range of Ms point to 600° C. for 20 to 500 s and maintaining concentration of hydrogen in furnace at 1.0 to 10.0 vol % at all times during retention of steel sheet]

After the annealing step, the steel sheet is cooled to be in a temperature range of the Ms point or higher and 600° C. or lower and retained at the temperature range of the Ms point to 600° C. for 20 to 500 s. This will be referred to as the first retention step. The average cooling rate at the time of cooling the steel sheet after the annealing step to the temperature range of the Ms point to 600° C. is preferably, for example, 5° C./s or more. The average cooling rate mentioned herein refers to a value obtained by dividing the temperature difference between the steel sheet temperature at the time of starting cooling and 600° C. by the time difference taken from the time of starting cooling until when the steel sheet temperature reaches 600° C.

When the steel sheet is retained in the temperature range from the Ms point to 600° C. before being immersed in the hot-dip galvanizing bath, hydrogen that has infiltrated the steel sheet in the annealing step diffuses to the outside air, and it is possible to reduce the amount of hydrogen that infiltrates the steel sheet. From the viewpoint of hydrogen diffusion, the lower the concentration of hydrogen in the furnace, the more preferable. However, when the concentration of hydrogen in the furnace is too low, the surface of the steel sheet is oxidized, and the wettability with the hot-dip galvanizing deteriorates. Therefore, the concentration of hydrogen in the furnace is set to be 1.0 vol % or more. The concentration of hydrogen in the furnace is preferably 2.0 vol % or more. On the other hand, when the concentration of hydrogen in the furnace is more than 10.0 vol %, hydrogen in the steel sheet does not sufficiently diffuse to the outside air. Therefore, the concentration of hydrogen in the furnace is set to be 10.0 vol % or less. The concentration of hydrogen in the furnace is preferably 5.0 vol % or less.

When the retention temperature in the first retention step is lower than the Ms point, generated martensite is excessively tempered by the subsequent plating and alloying treatment, and it becomes impossible to obtain a desired strength. Therefore, the retention temperature is set to be the Ms point or higher. The retention temperature is preferably the Ms point+100° C. or higher. On the other hand, when the retention temperature in the first retention step exceeds 600° C., ferrite is excessively generated, and a desired steel microstructure cannot be obtained. Therefore, the retention temperature is set to be 600° C. or lower. The retention temperature is preferably 550° C. or lower.

In addition, from the viewpoint of hydrogen diffusion, the longer the retention time in the first retention step is, the more preferable. However, when the retention time is too long, bainitic transformation excessively proceeds, and it becomes impossible to obtain a desired microstructural fraction. Therefore, the retention time is set to be 20 to 500 s. A preferred lower limit is 100 s, and a preferred upper limit is 300 s. The retention time mentioned herein refers to the time taken from when the steel sheet temperature reaches 600° C. until when the steel sheet is immersed in the hot-dip galvanizing bath.

In the first retention step, the steel sheet temperature may be fluctuated in the temperature range of the Ms point to 600° C. or the steel sheet temperature may be kept constant in the temperature range of the Ms point to 600° C.

(III) Plating Step

After the first retention step, the steel sheet is immersed in a hot-dip galvanizing bath. Hot-dip galvanizing needs to be carried out according to an ordinary method. For example, the plating bath temperature needs to be set to 440° C. to 480° C., and the immersion time needs to be set to 5 s or shorter. At this time, in a case where the retention temperature in the first retention step is significantly different from the plating bath temperature, the plating bath temperature can be stably maintained even during continuous manufacturing by reheating or cooling the steel sheet after the first retention step to make the steel sheet temperature close to the plating bath temperature. The hot-dip galvanizing bath preferably contains 0.08 to 0.2 mass % of Al as a component other than zinc and, additionally, may also contain Fe, Si, Mg, Mn, Cr, Ti, Ni, Cu, Sn, Sb, and Pb as impurities. In addition, the basis weight of the zinc-plated layer (hot-dip galvanized layer) is preferably controlled by a well-known method such as gas wiping. The basis weight is preferably 25 to 75 g/m$^2$ per single surface.

[Alloying temperature: 460° C. to 600° C.]

An alloying treatment may be carried out as necessary on the zinc-plated steel sheet on which the hot-dip galvanized layer is formed. In that case, when the alloying temperature is lower than 460° C., the alloying rate becomes slower, which impairs the productivity, and the alloying treatment is also unevenly carried out. Therefore, the alloying temperature is set to be 460° C. or higher. The alloying temperature is preferably 480° C. or higher. On the other hand, when the alloying temperature exceeds 600° C., alloying proceeds excessively, and the plating adhesion of the zinc-plated steel sheet deteriorates. Therefore, the alloying temperature is set to be 600° C. or lower. The alloying temperature is preferably 580° C. or lower. The alloying treatment time (retention time in a temperature range of 460° C. to 600° C.) needs to be set to, for example, 10 to 60 s.

In a case where the hot-dip galvanized layer is not alloyed, the cooling of the steel sheet may be started after plating without carrying out the alloying treatment.

[After hot-dip galvanizing or alloying treatment, steel sheet being cooled to lower than Ms point −150° C.]

After hot-dip galvanizing (after lifting the steel sheet from the hot-dip galvanizing bath) or after the alloying treatment, the steel sheet is cooled to be in a temperature range of lower than the Ms point −150° C., thereby causing the martensitic transformation of a part of austenite. Martensite generated at this time is tempered by the subsequent second retention step and turned into tempered martensite. When the cooling stop temperature reaches the Ms point −150° C. or higher, since the amount of tempered martensite generated, which is finally obtained, becomes insufficient, it is not possible to obtain a desired steel microstructure. Therefore, the cooling stop temperature is set to be lower than the Ms point −150° C.

At the time of cooling the steel sheet to the temperature range of lower than the Ms point −150° C. after hot-dip galvanizing or after the alloying treatment, the average cooling rate is preferably 5° C./s or more. The average cooling rate mentioned herein refers to a value obtained by dividing the temperature difference between the steel sheet temperature at the time of ending hot-dip galvanizing (the time of lifting the steel sheet from the hot-dip galvanizing bath) or at the time of ending the alloying treatment and the cooling stop temperature by the time difference taken from when the steel sheet is lifted from the hot-dip galvanizing bath or when the alloying treatment ends until the time of stopping cooling.

(IV) Second Retention Step

[Retaining steel sheet in atmosphere having concentration of hydrogen of less than 0.50 vol % in temperature range of 200° C. or higher and lower than 350° C. for 10 to 1000 s and then coiling steel sheet in coil shape]

At the same time as tempering martensite generated after hot-dip galvanizing or after the alloying treatment, the steel sheet is retained for the purpose of diffusing hydrogen present inside the steel sheet, in the interface between the steel sheet and the zinc-plated layer, and in the zinc-plated layer to the outside air. The step of retaining the steel sheet as described above is referred to as the second retention step. In the present embodiment, the second retention step is carried out under conditions described below, whereby it is possible to reduce the amount of hydrogen in the steel sheet and to improve the hydrogen embrittlement resistance.

In a case where the retention temperature in the second retention step is lower than 200° C., martensite is not sufficiently tempered, and thus the retention temperature is set to be 200° C. or higher. The retention temperature is preferably 230° C. or higher. When the retention time is shorter than 10 s, hydrogen is not sufficiently diffused, and thus the retention time is set to be 10 s or longer. The retention time is preferably 50 s or longer or 100 s or longer.

When the retention temperature in the second retention step is 350° C. or higher or the retention time exceeds 1000 s, martensite is excessively tempered, and it becomes difficult to obtain a desired strength. Therefore, the retention temperature is set to be lower than 350° C., and the retention time is set to be 1000 s or shorter. Preferably, the retention temperature is 320° C. or lower or 300° C. or lower, and the retention time is 700 s or shorter or 500 s or shorter. The retention time mentioned herein refers to the time taken from when the steel sheet temperature reaches 350° C. until when the steel sheet temperature reaches 200° C. Here, the time taken for the steel sheet temperature to reach the Ms point −150° C. is not included.

In the second retention step, the steel sheet temperature may be fluctuated in the temperature range of 200° C. or higher and lower than 350° C. or the steel sheet temperature may be kept constant in the temperature range of 200° C. or higher and lower than 350° C.

The concentration of hydrogen in the furnace in the second retention step is set to be less than 0.50 vol %. When the concentration of hydrogen in the furnace is 0.50 vol % or more, hydrogen is not sufficiently diffused into the atmosphere. The lower the concentration of hydrogen in the furnace, the more preferable. The concentration of hydrogen in the furnace is preferably 0.30 vol % or less, 0.20 vol % or less, or less than 0.10 vol %.

The second retention step is supposed to be carried out after hot-dip galvanizing or after the alloying treatment and before the coiling of the steel sheet in a coil shape. This is because, even when the steel sheet is retained in a state of being coiled in a coil shape, hydrogen is diffused only from the outermost circumferential portion of the coil, and hydrogen inside the coil is not sufficiently diffused.

The second retention step may be carried out on the zinc-plated steel sheet after the steel sheet is hot-dip galvanized and cooled to lower than the Ms point −150° C. or after the steel sheet is alloying-treated and cooled to lower than the Ms point −150° C. or the second retention step may be carried out after reheating.

In the present embodiment, manufacturing conditions for the steps carried out until the steel sheet is delivered to the continuous hot-dip galvanizing line do not need to be particularly limited, but preferred examples will be described below.

"Manufacturing Conditions in Hot Rolling Step"

[Slab heating step, slab heating temperature: 1150° C. or higher]

In order to sufficiently dissolve boride, carbide, or the like, the slab heating temperature is preferably set to 1150° C. or higher. From the viewpoint of manufacturability, the slab being used is preferably cast by a continuous casting method, but the slab may be cast by an ingot-making method or a thin slab casting method. In addition, the cast slab may be once cooled to a room temperature or may be directly sent to a heating furnace without being cooled to a room temperature.

[Rough rolling step, total rolling reduction at 1050° C. or higher: 60% or larger]

Rough rolling is preferably carried out such that the total rolling reduction at 1050° C. or higher reaches 60% or larger. When the total rolling reduction is smaller than 60%, since recrystallization during hot rolling becomes insufficient, there is a case where the microstructure of the hot-rolled sheet becomes inhomogeneous.

[Finish rolling step, finish rolling inlet temperature: 950° C. to 1060° C., finish rolling outlet temperature: 850° C. to 1000° C., total rolling reduction: 70% to 95%]

The finish rolling inlet temperature is preferably 950° C. to 1060° C. and may be 950° C. to 1050° C.

In addition, in a case where the finish rolling outlet temperature is lower than 850° C. or the total rolling reduction exceeds 95%, since the texture of the hot-rolled steel sheet develops, there is a case where the anisotropy becomes apparent in a final product sheet. When the finish rolling outlet temperature exceeds 1000° C. or the total rolling reduction is smaller than 70%, the grain size of the hot-rolled steel sheet coarsens, which leads to the coarsening of the microstructure of the final product sheet and, furthermore, the deterioration of workability in some cases.

[Coiling step, coiling temperature: 450° C. to 700° C.]

The coiling temperature is set to be 450° C. to 700° C. When the coiling temperature is lower than 450° C., the strength of the hot-rolled sheet becomes excessively high, and there is a case where the cold rolling ductility is impaired. On the other hand, when the coiling temperature exceeds 700° C., cementite coarsens, non-melted cementite remains, and there is a case where the workability is impaired.

The pickling method of the hot-rolled coil needs to be based on an ordinary method. In addition, skin pass rolling may be carried out in order to correct the shape of the hot-rolled coil and to improve the pickling property. In addition, softening annealing (hot-band annealing) may be carried out in order to improve the cold rolling ductility. In such a case, a heat treatment is desirably carried out in a temperature range of 500° C. to 650° C. for 0.5 to 10 hours.

"Manufacturing Conditions in Cold Rolling Step"

[Cold rolling ratio: 20% to 80%]

After hot rolling and pickling, the heat treatment may be carried out immediately in the continuous hot-dip galvanizing line or the heat treatment may be carried out after cold rolling in the continuous hot-dip galvanizing line. In a case where cold rolling is carried out, the cold rolling ratio (cumulative rolling reduction) is preferably set to 20% or more. On the other hand, excessive reduction makes the rolling load excessive and causes an increase in the load of a cold rolling mill, and thus the cold rolling ratio is preferably set to 80% or less.

EXAMPLES

Next, examples of the present invention will be described. Conditions in the examples are simply examples of conditions adopted to confirm the feasibility and effect of the present invention. The present invention is not limited to these examples of the conditions. The present invention is capable of adopting a variety of conditions as long as the object of the present invention is achieved without departing from the gist of the present invention.

Steels having a chemical composition shown in Table 1A and Table 1B were cast to produce slabs. Table 1B shows the $Ac_3$ point and the Ms point of each steel that are obtained by the following relational formulae. These slabs were hot-rolled under conditions shown in Table 2A and Table 2B to manufacture hot-rolled steel sheets. After that, the hot-rolled steel sheets were pickled to remove scale on the surfaces. After that, the hot-rolled steel sheets were cold-rolled to obtain steel sheets. Continuous hot-dip galvanizing was carried out on the obtained steel sheets under conditions shown in Table 3A and Table 3B, and an alloying treatment was carried out on some of the zinc-plated steel sheets. Regarding plating types in Table 3A to Table 4B, 'GA' indicates a hot-dip galvannealed layer, and 'GI' indicates a hot-dip galvanized layer.

$$Ac_3(° C.)=912-230.5\times[C]+31.6\times[Si]-20.4\times[Mn]-39.8\times[Cu]-18.1\times[Ni]-14.8\times[Cr]+16.8\times[Mo]+100.0\times[Al]$$

$$Ms(° C.)=550-361\times[C]-39\times[Mn]-35\times[V]-20\times[Cr]-17\times[Ni]-10\times[Cu]-5\times[Mo]+30\times[Al]$$

Here, element symbols in each formula indicate the amounts of the respective elements by mass %. In a case where an element was not contained, a value of 0% was substituted.

The average cooling rate from the time of starting cooling until when the steel sheet temperature reached 600° C. (from the time of ending the annealing step to the time of starting the first retention step) and the average cooling rate from the time of ending hot-dip galvanizing or the time of ending the alloying treatment until when the steel sheet temperature reached the cooling stop temperature were respectively set to 5° C./s or more. In addition, the plating bath temperature in the plating step was set to 440° C. to 480° C., the immersion time was set to 5 s or shorter, and, as the hot-dip galvanizing bath, a hot-dip galvanizing bath containing 0.08 to 0.2 mass % of Al in addition to zinc was used. The iron amount of the hot-dip galvannealed layer after the alloying treatment was 6.0 mass % or more, and the iron amount of the hot-dip galvanized layer was less than 7.0 mass %.

The concentrations of hydrogen in the annealing step in Table 3A and Table 3B are the concentrations of hydrogen in the furnace from when the steel sheet temperature reached 600° C. until when the retention of the steel sheet in the temperature range of the $Ac_3$ point to 950° C. ended (in other words, from when the steel sheet was heated in the furnace and the steel sheet temperature reached 600° C. until when the steel sheet was heated up to the temperature range of the $Ac_3$ point to 950° C. and retained in the temperature range of the $Ac_3$ point to 950° C. and the steel sheet was removed from the furnace), and the concentration of hydrogen in the furnace in the first retention step is the concentration of hydrogen in the furnace during the retention of the steel sheet in the temperature range of the Ms point to 600° C.

It should be noted that, for No. 21 in Table 3A, since the steel sheet was not retained in the temperature range of the $Ac_3$ point to 950° C. in the annealing step, but was retained at 820° C. for 100 s, '-' is entered for the retention time.

A JIS No. 5 tensile test piece having a longitudinal direction in a direction perpendicular to the rolling direction was collected from the obtained zinc-plated steel sheet, and a tensile test was carried out in accordance with JIS Z 2241:2011, thereby measuring the tensile strength (TS) and the total elongation (El). In the tensile test, the cross-head rate was set to 2 mm/min for 2% or smaller strain and was set to 20 mm/min for strain of larger than 2%. The total elongation was measured by abutting fractured samples.

In addition, 'JFS T 1001-1996 Method of Hole Expanding Test' of The Japan Iron and Steel Federation standard was carried out to measure the hole expansion ratio (λ). The blank size was set to 150 mm. Regarding the blanking conditions, the punch diameter was set to 10 mm, and the die diameter was set such that the single side clearance became closest to 12% at a 0.1 mm pitch. The hole expanding test was carried out with a 60-degree conical punch at a punch rate of 1 mm/s under a condition irrelevant to burrs, that is, a condition that the surface of the steel sheet that had been in contact with the die at the time of blanking was on the opposite side of the punch at the time of the hole expanding test. In addition, the blank holder pressure was set to 60 tons, the die shoulder R was set to 5 mm, and the inner diameter of the die was set to φ95 mm. The number of times of testing was set to three (N=3), and the average value of the hole expansion ratios in the respective tests was calculated, thereby obtaining the hole expansion ratio λ.

When the tensile strength was 1470 MPa or more, and the composite value of the tensile strength, the total elongation, and the hole expansion ratio (TS [MPa]×EL [%]×λ [%]$^{0.5}$× $10^{-3}$) was 50 or more, the test piece was considered to have favorable mechanical properties and determined as acceptable. In a case where one or more conditions were not satisfied, the test piece was considered to have poor mechanical properties and determined as unacceptable.

The amount of hydrogen per mass of the steel sheet that was emitted when the steel sheet was heated up to 200° C. from a room temperature was obtained by the following method. The front and rear surfaces of the zinc-plated steel sheet were each mechanically ground by 0.1 mm in order to remove the zinc-plated layer (hot-dip galvanized layer or hot-dip galvannealed layer), then, hydrogen in the steel sheet after the removal of the plate was measured by a temperature rising hydrogen analysis method using a gas chromatograph (temperature rising rate: 100° C./hour, measured from a room temperature up to 300° C.), and the cumulative amount (measurement value of gas chromatograph) of the masses of hydrogen emitted from the steel sheet while the steel sheet was heated up to 200° C. from a room temperature was obtained. The obtained cumulative amount (measurement value by gas chromatograph) of the masses of hydrogen was divided by the mass of the steel sheet, thereby obtaining the amount of hydrogen per mass of the steel sheet (mass ppm) that was emitted when the steel sheet was heated up to 200° C. from a room temperature.

The hydrogen embrittlement resistance test was evaluated by a U-shape bending test. The U-shape bending test will be described with reference to FIG. 1.

First, from a soaking region of the zinc-plated steel sheet, a 30 mm×120 mm strip test piece was collected such that the longitudinal direction of the test piece and the rolling direction of the steel sheet became perpendicular to each other. On both ends of this strip test piece, holes for bolt fastening were opened. Next, the test piece was bent 180° with a punch having a radius of 10 mm ((1) in FIG. 1). After that, the U-shape bent test piece that had sprung back ((2) in FIG. 1) was fastened using a bolt and a nut to apply a stress ((3) in FIG. 1). At this time, a GL 5 mm strain gauge was attached to the top of the U-shape bent test piece, and stresses equivalent to 1000 MPa and 1200 MPa were applied by controlling the strain amount. At this time, the strain was converted to stress from a stress-strain curve obtained by carrying out a tensile test in advance. It should be noted that the end surface of the U-shape bent test piece was left as shear-cut. In addition, the testing temperature was set to a room temperature (15° C. to 25° C.).

After 24 hours from the application of the stress, the presence or absence of cracking was visually observed. In the tables, '<1000' is entered for steel sheets in which cracking was recognized at 1000 MPa, '1000 to 1200' is entered for steel sheets in which cracking was not recognized at 1000 MPa, but recognized at 1200 MPa, and '>1200' is entered for steel sheets in which cracking was not recognized at 1200 MPa. Steel sheets in which cracking was not recognized at 1000 MPa were considered to have excellent hydrogen embrittlement resistance and determined as acceptable, and steel sheets in which cracking was recognized at 1000 MPa were considered to have poor hydrogen embrittlement resistance and determined as unacceptable.

The low temperature toughness of the zinc-plated steel sheet was evaluated by measuring the ductile-brittle transition temperature by a Charpy impact test.

A Charpy test piece that was to be used in the Charpy impact test was collected such that the longitudinal direction of the test piece became parallel to the rolling direction of the zinc-plated steel sheet, and a V notch was introduced in the sheet width direction. In addition, as the Charpy test piece, a plurality of the zinc-plated steel sheets was stacked and fastened with a bolt in order to avoid out-of-plane distortion, the fact that there was no gap between the zinc-plated steel sheets was confirmed, and then a test piece provided with a 2 mm-deep V notch was produced. The number of the zinc-plated steel sheets that were stacked was set such that the thickness of the test piece after stacking became closest to 10 mm. The ductile-brittle transition temperature was measured at testing temperatures in a range of −40° C. to 60° C. at 20° C. intervals. The maximum temperature at which the absorbed energy was below ½ of the upper shelf absorbed energy was regarded as the ductile-brittle transition temperature (Trs). Conditions other than the above-described conditions were based on JIS Z 2242:2005.

In a case where the ductile-brittle transition temperature was −40° C. or lower, the low temperature toughness was evaluated as excellent, and '<−40' was entered in the tables. In a case where the ductile-brittle transition temperature was higher than −40° C., the ductile-brittle transition temperature was entered in the tables.

Plating adhesion was evaluated by a tape exfoliation test. A 30 mm×100 mm test piece was collected from the soaking region of the zinc-plated steel sheet, and a 90° V bending test was carried out. The tip radius of a punch was set to 5 mm. After that, commercially available cellophane tape (registered trademark) was attached along the bending ridge, and the width of the plate attached to the tape was measured as the exfoliation width. The evaluation was as described below.

G (Good): Small amount of plating peeling or exfoliation that is practically permissible (exfoliation width of 0 to less than 10 mm)

B (Bad): Severe exfoliation (exfoliation width of 10 mm or more)

Steel microstructures in the steel sheets were measured by the above-described method.

The measurement results and the test results described above are shown in Table 4A and Table 4B.

From Table 4A and Table 4B, it is found that all of the invention examples were excellent in terms of the mechanical properties, the hydrogen embrittlement resistance, and the plating adhesion and it was possible to reduce the amount of hydrogen that had infiltrated the steel sheet during manufacturing. On the other hand, it is found that, in the comparative examples in which one or more selected from the group consisting of the chemical compositions and the steel microstructures were outside the scope of the present invention, at least one of the above-described characteristics failed to satisfy the acceptance criteria.

In No. 2, since the concentration of $H_2$ in the first retention step was above the defined upper limit, the concentration of hydrogen in steel increased, and the hydrogen embrittlement resistance was poor.

In No. 3, since the retention time in the first retention step was below the defined lower limit, the concentration of hydrogen in steel increased, and the hydrogen embrittlement resistance was poor.

In No. 4, since the retention temperature in the first retention step was above the defined upper limit, the amount of ferrite increased, and the tensile strength TS became less than 1470 MPa.

In No. 5, since the cooling stop temperature after the alloying treatment was above the defined upper limit, the amount of bainite and the amount of fresh martensite increased, and the mechanical properties became poor.

In No. 6, since the retention time in the second retention step was below the defined lower limit, the concentration of hydrogen in steel increased, and the hydrogen embrittlement resistance was poor.

In No. 8, since the concentration of $H_2$ in the second retention step was above the defined upper limit, the concentration of hydrogen in steel increased, and the hydrogen embrittlement resistance was poor.

In No. 10, since the retention temperature in the second retention step was above the upper limit, and tempered martensite was excessively tempered, the tensile strength TS became less than 1470 MPa.

In No. 11, since the retention temperature in the second retention step was below the lower limit, the concentration of hydrogen in steel increased, and the hydrogen embrittlement resistance was poor.

In No. 13, since the retention time in the second retention step was long, and tempered martensite was excessively tempered, the tensile strength TS became less than 1470 MPa.

In No. 16, since the second retention step was not carried out, the concentration of hydrogen in steel increased, and the hydrogen embrittlement resistance was poor.

In No. 19, since the retention temperature in the first retention step was below the lower limit, martensite was tempered during the alloying treatment, and the tensile strength TS became less than 1470 MPa.

In No. 20, since the concentration of $H_2$ in the annealing step was above the defined upper limit, the concentration of hydrogen in steel increased, and the hydrogen embrittlement resistance was poor.

In No. 21, since the heating temperature in the annealing step was below the defined lower limit, the amount of ferrite increased, and the tensile strength TS became less than 1470 MPa.

In No. 22, since the retention time in the first retention step was above the defined upper limit, the amount of bainite increased, and the tensile strength TS became less than 1470 MPa.

In Nos. 38 to 42, since the chemical compositions were not in the range defined by the present invention, the mechanical properties became poor, and/or the hydrogen embrittlement resistance was poor.

In No. 43, since the second retention step was not carried out, the amount of fresh martensite increased, and the hydrogen embrittlement resistance was poor.

In No. 44, since the retention temperature in the second retention step was below the defined lower limit, the amount of fresh martensite increased, and the hydrogen embrittlement resistance was poor.

In No. 45, since the retention time in the second retention step was below the defined lower limit, the amount of fresh martensite increased, and the hydrogen embrittlement resistance was poor.

In No. 48, since the concentration of $H_2$ in the second retention step was above the defined upper limit, the concentration of hydrogen in steel increased, and the hydrogen embrittlement resistance was poor.

TABLE 1A

| Steel type | Chemical composition (mass %) remainder: iron and impurity | | | | | | | | | | | | | | | | | |
|---|---|---|---|---|---|---|---|---|---|---|---|---|---|---|---|---|---|---|
| | C | Si | Mn | P | S | Al | N | O | Cr | Mo | Cu | Ni | Co | W | Sn | Sb | Nb | Note |
| A | 0.217 | 0.64 | 2.63 | 0.016 | 0.0033 | 0.021 | 0.0034 | 0.0011 | | 0.09 | | | | | | | | Invention Example |
| B | 0.305 | 0.41 | 2.41 | 0.015 | 0.0021 | 0.016 | 0.0043 | 0.0010 | 0.25 | 0.13 | | | | | | | 0.028 | Invention Example |
| C | 0.199 | 1.16 | 2.53 | 0.020 | 0.0027 | 0.023 | 0.0028 | 0.0020 | | | | | | | | | 0.010 | Invention Example |

TABLE 1A-continued

| Steel type | \multicolumn{16}{c}{Chemical composition (mass %) remainder: iron and impurity} | Note |
|---|---|---|---|---|---|---|---|---|---|---|---|---|---|---|---|---|---|
| | C | Si | Mn | P | S | Al | N | O | Cr | Mo | Cu | Ni | Co | W | Sn | Sb | Nb | |
| D | 0.230 | 0.38 | 1.80 | 0.020 | 0.0034 | 0.022 | 0.0037 | 0.0015 | | 0.17 | 0.12 | | | | | | | Invention Example |
| E | 0.210 | 0.58 | 2.21 | 0.011 | 0.0032 | 0.026 | 0.0040 | 0.0010 | 0.21 | 0.1 | | 0.10 | 0.13 | | | | | Invention Example |
| F | 0.222 | 0.29 | 2.55 | 0.008 | 0.0023 | 0.379 | 0.0042 | 0.0023 | | | | | | | | | | Invention Example |
| G | 0.202 | 0.85 | 2.39 | 0.016 | 0.0028 | 0.018 | 0.0037 | 0.0015 | | | | | | | 0.15 | 0.10 | | Invention Example |
| H | 0.219 | 0.58 | 2.50 | 0.019 | 0.0010 | 0.024 | 0.0042 | 0.0011 | | | | | | | | | | Invention Example |
| I | 0.219 | 0.57 | 2.54 | 0.008 | 0.0020 | 0.028 | 0.0028 | 0.0037 | | | | | | | | | | Invention Example |
| J | 0.214 | 0.59 | 2.56 | 0.011 | 0.0018 | 0.019 | 0.0042 | 0.0031 | | | | | | | | | | Invention Example |
| K | 0.210 | 0.53 | 2.58 | 0.013 | 0.0018 | 0.029 | 0.0025 | 0.0017 | | | | | | | | | | Invention Example |
| L | 0.255 | 0.45 | 2.60 | 0.012 | 0.0018 | 0.029 | 0.0027 | 0.0029 | | | | | | | | | | Invention Example |
| M | 0.325 | 0.67 | 2.69 | 0.014 | 0.0031 | 0.023 | 0.0036 | 0.0026 | | | | | | | | | 0.035 | Invention Example |
| N | 0.193 | 0.32 | 3.72 | 0.012 | 0.0026 | 0.017 | 0.0037 | 0.0028 | | | | | | | | | | Invention Example |
| O | 0.218 | 0.05 | 2.44 | 0.019 | 0.0018 | 0.019 | 0.0041 | 0.0012 | | | | | | | | | | Invention Example |
| P | 0.203 | 1.89 | 2.35 | 0.009 | 0.0013 | 0.025 | 0.0043 | 0.0022 | | | | | | | | | | Invention Example |
| Q | <u>0.129</u> | 0.50 | 2.66 | 0.013 | 0.0021 | 0.021 | 0.0034 | 0.0026 | | | | | | | | | | Comparative Example |
| R | <u>0.524</u> | 0.56 | 2.69 | 0.016 | 0.0030 | 0.026 | 0.0040 | 0.0026 | | | | | | | | | | Comparative Example |
| S | 0.216 | 0.52 | <u>0.87</u> | 0.019 | 0.0027 | 0.024 | 0.0040 | 0.0024 | | | | | | | | | | Comparative Example |
| T | 0.179 | 0.57 | <u>5.69</u> | 0.007 | 0.0033 | 0.030 | 0.0033 | 0.0012 | | | | | | | | | | Comparative Example |
| U | 0.201 | <u>2.94</u> | 2.25 | 0.020 | 0.0037 | 0.029 | 0.0039 | 0.0028 | | | | | | | | | | Comparative Example |
| V | 0.180 | 1.00 | 2.50 | 0.015 | 0.0023 | 0.030 | 0.0028 | 0.0009 | 0.5 | | | | 0.5 | | | | | Invention Example |

Underlines indicate that corresponding values are outside the scope of the present invention.

TABLE 1B

| Steel type | \multicolumn{4}{c}{Chemical composition (mass) remainder: iron and impurity} | $Ac_3$ (°C.) | Ms (°C.) | Note |
|---|---|---|---|---|---|---|---|
| | Ti | V | B | Others | | | |
| A | 0.025 | | 0.0028 | | 832 | 369 | Invention Example |
| B | 0.022 | | 0.0021 | | 806 | 341 | Invention Example |
| C | 0.030 | | 0.0028 | | 853 | 380 | Invention Example |
| D | 0.024 | | 0.0023 | | 828 | 394 | Invention Example |
| E | | | | | 838 | 384 | Invention Example |
| F | 0.036 | 0.15 | 0.0028 | | 856 | 377 | Invention Example |
| G | 0.020 | | 0.0019 | | 845 | 384 | Invention Example |
| H | 0.019 | | 0.0027 | Ca: 0.0037, Mg: 0.0052 | 831 | 374 | Invention Example |
| I | 0.024 | | 0.0023 | La: 0.0054, Hf: 0.0071 | 831 | 373 | Invention Example |
| J | 0.028 | | 0.0024 | Bi: 0.0045, Zr: 0.0054 | 831 | 373 | Invention Example |
| K | 0.026 | | 0.0020 | REM: 0.010, Ce: 0.0041 | 831 | 374 | Invention Example |
| L | 0.024 | | 0.0020 | | 817 | 357 | Invention Example |
| M | 0.020 | | 0.0023 | | 806 | 328 | Invention Example |
| N | | | | | 803 | 336 | Invention Example |
| O | 0.027 | | 0.0029 | | 815 | 377 | Invention Example |
| P | 0.020 | | 0.0020 | | 879 | 386 | Invention Example |
| Q | 0.023 | | 0.0024 | | 846 | 400 | Comparative Example |
| R | 0.029 | | 0.0025 | | 757 | 257 | Comparative Example |
| S | 0.027 | | 0.0029 | | 863 | 439 | Comparative Example |
| T | 0.026 | | 0.0022 | | 776 | 264 | Comparative Example |
| U | 0.026 | | 0.0022 | | 916 | 391 | Comparative Example |
| V | | | | | 838 | 370 | Invention Example |

TABLE 2A

| No. | Steel type | Slab heating temperature (° C.) | Total rolling reduction at 1050° C. or higher (%) | Finish rolling inlet temperature (° C.) | Finish rolling outlet temperature (° C.) | Finish rolling total rolling reduction (%) | Coiling temperature (° C.) | Cold rolling Cold rolling reduction (%) |
|---|---|---|---|---|---|---|---|---|
| 1 | A | 1260 | 86 | 1020 | 940 | 91 | 560 | 52 |
| 2 | A | 1260 | 86 | 1030 | 950 | 91 | 560 | 52 |
| 3 | A | 1250 | 86 | 1020 | 920 | 91 | 560 | 52 |
| 4 | A | 1250 | 86 | 1020 | 930 | 91 | 530 | 52 |
| 5 | A | 1250 | 86 | 1020 | 940 | 91 | 570 | 52 |
| 6 | A | 1240 | 86 | 1020 | 940 | 91 | 560 | 52 |
| 7 | A | 1240 | 86 | 1030 | 950 | 91 | 530 | 52 |
| 8 | A | 1230 | 86 | 1030 | 930 | 91 | 550 | 52 |
| 9 | A | 1270 | 86 | 1020 | 930 | 91 | 560 | 52 |
| 10 | A | 1230 | 86 | 1030 | 940 | 91 | 560 | 52 |
| 11 | A | 1270 | 86 | 1040 | 960 | 91 | 540 | 52 |
| 12 | A | 1230 | 86 | 1040 | 960 | 91 | 570 | 52 |
| 13 | A | 1230 | 86 | 1030 | 940 | 91 | 530 | 52 |
| 14 | A | 1250 | 86 | 1050 | 950 | 91 | 580 | 52 |
| 15 | A | 1260 | 86 | 1030 | 950 | 91 | 550 | 52 |
| 16 | A | 1250 | 86 | 1030 | 930 | 91 | 540 | 52 |
| 17 | A | 1230 | 86 | 1030 | 940 | 91 | 570 | 52 |
| 18 | A | 1270 | 36 | 1030 | 950 | 91 | 540 | 52 |
| 19 | A | 1270 | 86 | 1040 | 940 | 91 | 540 | 52 |
| 20 | A | 1240 | 86 | 1060 | 980 | 91 | 560 | 52 |
| 21 | A | 1270 | 86 | 1020 | 940 | 91 | 560 | 52 |
| 22 | A | 1240 | 86 | 1030 | 940 | 91 | 540 | 52 |
| 23 | B | 1240 | 86 | 1040 | 950 | 91 | 560 | 52 |
| 24 | C | 1240 | 86 | 1040 | 950 | 91 | 540 | 52 |
| 25 | D | 1260 | 86 | 1040 | 940 | 91 | 550 | 52 |

TABLE 2B

| No. | Steel type | Slab heating temperature (° C.) | Total rolling reduction at 1050° C. or higher (%) | Finish rolling inlet temperature (° C.) | Finish rolling outlet temperature (° C.) | Finish rolling total rolling reduction (%) | Coiling temperature (° C.) | Cold rolling Cold rolling reduction (%) |
|---|---|---|---|---|---|---|---|---|
| 26 | E | 1250 | 86 | 1020 | 920 | 91 | 540 | 52 |
| 27 | F | 1240 | 86 | 1020 | 930 | 91 | 530 | 52 |
| 28 | G | 1260 | 86 | 1020 | 930 | 91 | 530 | 52 |
| 29 | H | 1270 | 86 | 1060 | 970 | 91 | 530 | 52 |
| 30 | I | 1270 | 86 | 1050 | 960 | 91 | 560 | 52 |
| 31 | J | 1240 | 86 | 1040 | 960 | 91 | 540 | 52 |
| 32 | K | 1240 | 86 | 1020 | 920 | 91 | 530 | 52 |
| 33 | L | 1270 | 86 | 1030 | 940 | 91 | 550 | 52 |
| 34 | M | 1270 | 86 | 1060 | 980 | 91 | 570 | 52 |
| 35 | N | 1270 | 86 | 1050 | 950 | 91 | 570 | 52 |
| 36 | O | 1260 | 86 | 1030 | 950 | 91 | 530 | 52 |
| 37 | P | 1230 | 86 | 1040 | 940 | 91 | 530 | 52 |
| 38 | Q | 1260 | 86 | 1050 | 970 | 91 | 550 | 52 |
| 39 | R | 1250 | 86 | 1030 | 940 | 91 | 530 | 52 |
| 40 | S | 1250 | 86 | 1040 | 950 | 91 | 560 | 52 |
| 41 | T | 1230 | 86 | 1040 | 940 | 91 | 530 | 52 |
| 42 | U | 1240 | 86 | 1030 | 930 | 91 | 570 | 52 |
| 43 | V | 1200 | 66 | 1050 | 900 | 91 | 500 | 52 |
| 44 | V | 1200 | 86 | 1050 | 900 | 91 | 500 | 52 |
| 45 | V | 1200 | 86 | 1050 | 900 | 91 | 500 | 52 |
| 46 | A | 1260 | 86 | 1020 | 940 | 91 | 560 | 52 |
| 47 | A | 1250 | 86 | 1030 | 940 | 91 | 550 | 52 |
| 48 | A | 1270 | 86 | 1040 | 950 | 91 | 500 | 52 |
| 49 | A | 1260 | 86 | 1050 | 940 | 91 | 540 | 52 |
| 50 | A | 1240 | 86 | 1050 | 960 | 91 | 540 | 52 |

Underlines indicate that corresponding vales are outside the scope of the present invention.

TABLE 3A

| | | Heat treatment | | | | | | | | | | | | Ms- | |
| | | Annealing conditions | | | | First retention | | | Cool- | Second retention | | | | cooling | Heating |
| | | | | | | Re- | | | Alloy- | ing | Re- | | | | |
| | Heating | Heating tem- | Re- tention | H₂ concen- | tention tem- | Re- tention | H₂ concen- | ing tem- | stop tem- | tention tem- | Re- tention | H₂ concen- | Plating | stop tem- | tem- perature |
| No. | rate (° C./s) | perature (° C.) | time (sec) | tration (vol %) | perature (° C.) | time (sec) | tration (vol %) | perature (° C.) | perature (° C.) | perature (° C.) | time (sec) | tration (vol %) | type | perature (° C.) | Ac₃ (° C.) |
|---|---|---|---|---|---|---|---|---|---|---|---|---|---|---|---|
| 1 | 1.8 | 850 | 100 | 5.0 | 550 | 120 | 3.0 | 500 | 60 | 280 | 250 | <0.1 | GA | 309 | 18 |
| 2 | 1.8 | 850 | 100 | 5.0 | 550 | 120 | 12.0 | 500 | 60 | 280 | 250 | <0.1 | GA | 309 | 18 |
| 3 | 1.8 | 850 | 100 | 5.0 | 550 | 10 | 5.0 | 500 | 60 | 280 | 250 | <0.1 | GA | 309 | 18 |
| 4 | 1.8 | 850 | 100 | 5.0 | 650 | 120 | 5.0 | 500 | 60 | 280 | 250 | <0.1 | GA | 309 | 18 |
| 5 | 1.8 | 680 | 100 | 5.0 | 550 | 120 | 3.0 | 500 | 260 | 280 | 250 | <0.1 | GA | 109 | 18 |
| 6 | 1.8 | 850 | 100 | 5.0 | 550 | 120 | 3.0 | 500 | 60 | 280 | 5 | <0.1 | GA | 309 | 18 |
| 7 | 1.8 | 850 | 100 | 5.0 | 550 | 120 | 3.0 | 500 | 60 | 280 | 50 | <0.1 | GA | 309 | 18 |
| 8 | 1.8 | 850 | 100 | 5.0 | 550 | 120 | 3.0 | 500 | 60 | 280 | 250 | 5.0 | GA | 309 | 18 |
| 9 | 1.8 | 850 | 100 | 5.0 | 550 | 120 | 3.0 | 500 | 200 | 280 | 250 | <0.1 | GA | 169 | 18 |
| 10 | 1.8 | 850 | 100 | 5.0 | 550 | 120 | 3.0 | 500 | 60 | 420 | 250 | <0.1 | GA | 309 | 18 |
| 11 | 1.8 | 850 | 100 | 5.0 | 550 | 120 | 3.0 | 500 | 60 | 150 | 250 | <0.1 | GA | 309 | 18 |
| 12 | 1.8 | 850 | 100 | 5.0 | 550 | 120 | 3.0 | 500 | 60 | 340 | 250 | <0.1 | GA | 309 | 18 |
| 13 | 1.8 | 850 | 100 | 5.0 | 550 | 120 | 3.0 | 500 | 60 | 280 | 1600 | <0.1 | GA | 309 | 18 |
| 14 | 1.8 | 835 | 100 | 5.0 | 550 | 120 | 3.0 | 500 | 60 | 280 | 250 | <0.1 | GA | 309 | 3 |
| 15 | 1.8 | 850 | 100 | 5.0 | 550 | 120 | 3.0 | 500 | 60 | 280 | 250 | <0.1 | GA | 309 | 18 |
| 16 | 1.8 | 850 | 100 | 5.0 | 550 | 120 | 3.0 | 500 | 60 | N/A | N/A | N/A | GA | 309 | 18 |
| 17 | 1.8 | 850 | 100 | 5.0 | 550 | 120 | 3.0 | N/A | 60 | 280 | 250 | <0.1 | GA | 309 | 18 |
| 18 | 1.8 | 850 | 100 | 5.0 | 430 | 120 | 3.0 | 500 | 60 | 260 | 250 | <0.1 | GA | 309 | 18 |
| 19 | 1.8 | 850 | 100 | 5.0 | 300 | 120 | 3.0 | 500 | 60 | 280 | 250 | <0.1 | GA | 309 | 18 |
| 20 | 1.8 | 850 | 100 | 18.0 | 550 | 120 | 3.0 | 500 | 60 | 280 | 250 | <0.1 | GA | 309 | 18 |
| 21 | 1.8 | 820 | — | 5.0 | 550 | 120 | 3.0 | 500 | 60 | 280 | 250 | <0.1 | GA | 309 | −12 |
| 22 | 1.8 | 850 | 100 | 5.0 | 550 | 900 | 3.0 | 500 | 60 | 250 | 250 | <0.1 | GA | 309 | 18 |
| 23 | 1.8 | 830 | 100 | 5.0 | 550 | 120 | 3.0 | 500 | 60 | 280 | 250 | <0.1 | GA | 281 | 24 |
| 24 | 1.8 | 870 | 100 | 5.0 | 550 | 120 | 3.0 | 500 | 60 | 280 | 250 | <0.1 | GA | 320 | 17 |
| 25 | 1.8 | 850 | 100 | 5.0 | 550 | 120 | 3.0 | 500 | 60 | 280 | 250 | <0.1 | GA | 334 | 22 |

Underlines indicate that corresponding values are outside the scope of the present invention.

TABLE 3B

| | | Heat treatment | | | | | | | | | | | | Ms - | |
| | | Annealing conditions | | | | First retention | | | Cool- | Second retention | | | | cooling | Heating |
| | | | | | | Re- | | | Alloy- | ing | Re- | | | | |
| | Heating | Heating tem- | Re- tention | H₂ concen- | tention tem- | Re- tention | H₂ concen- | ing tem- | stop tem- | tention tem- | Re- tention | H₂ concen- | Plating | stop tem- | tem- perature |
| No. | rate (° C./s) | perature (° C.) | time (sec) | tration (vol %) | perature (° C.) | time (sec) | tration (vol %) | perature (° C.) | perature (° C.) | perature (° C.) | time (sec) | tration (vol %) | type | perature (° C.) | Ac₃ (° C.) |
|---|---|---|---|---|---|---|---|---|---|---|---|---|---|---|---|
| 26 | 1.8 | 860 | 100 | 5.0 | 550 | 120 | 3.0 | 500 | 60 | 280 | 250 | <0.1 | GA | 324 | 22 |
| 27 | 1.8 | 870 | 100 | 5.0 | 550 | 120 | 3.0 | 500 | 60 | 280 | 250 | <0.1 | GA | 317 | 14 |
| 28 | 1.8 | 870 | 100 | 5.0 | 550 | 120 | 5.0 | 500 | 60 | 280 | 250 | <0.1 | GA | 324 | 25 |
| 29 | 1.8 | 850 | 100 | 5.0 | 350 | 120 | 5.0 | 500 | 60 | 280 | 250 | <0.1 | GA | 314 | 19 |
| 30 | 1.8 | 850 | 100 | 5.0 | 550 | 120 | 3.0 | 500 | 60 | 280 | 250 | <0.1 | GA | 313 | 19 |
| 31 | 1.8 | 850 | 100 | 5.0 | 550 | 120 | 3.0 | 500 | 60 | 280 | 250 | <0.1 | GA | 313 | 19 |
| 32 | 1.8 | 850 | 100 | 5.0 | 550 | 120 | 3.0 | 500 | 60 | 280 | 250 | <0.1 | GA | 314 | 19 |
| 33 | 1.8 | 840 | 100 | 5.0 | 550 | 120 | 3.0 | 500 | 60 | 280 | 250 | <0.1 | GA | 297 | 23 |
| 34 | 1.8 | 830 | 100 | 5.0 | 550 | 120 | 3.0 | 500 | 60 | 280 | 250 | <0.1 | GA | 268 | 24 |
| 35 | 1.8 | 830 | 100 | 5.0 | 550 | 120 | 3.0 | 500 | 60 | 280 | 250 | <0.1 | GA | 276 | 27 |
| 36 | 1.8 | 840 | 100 | 5.0 | 550 | 120 | 3.0 | 500 | 60 | 280 | 250 | <0.1 | GA | 317 | 25 |
| 37 | 1.8 | 900 | 100 | 5.0 | 550 | 120 | 3.0 | 500 | 60 | 280 | 250 | <0.2 | GA | 326 | 21 |
| 38 | 1.8 | 880 | 100 | 5.0 | 550 | 120 | 3.0 | 500 | 60 | 280 | 250 | <0.2 | GA | 340 | 34 |
| 39 | 1.8 | 800 | 100 | 5.0 | 550 | 120 | 3.0 | 500 | 60 | 280 | 250 | <0.2 | GA | 197 | 43 |
| 40 | 1.8 | 890 | 100 | 5.0 | 550 | 120 | 3.0 | 500 | 60 | 280 | 250 | <0.2 | GA | 379 | 27 |
| 41 | 1.8 | 820 | 100 | 5.0 | 550 | 120 | 3.0 | 500 | 60 | 280 | 250 | <0.2 | GA | 204 | 44 |
| 42 | 1.8 | 930 | 100 | 5.0 | 550 | 120 | 3.0 | 500 | 60 | 280 | 250 | <0.2 | GA | 331 | 14 |
| 43 | 1.8 | 850 | 150 | 15.0 | 500 | 50 | 3.0 | 500 | 60 | N/A | N/A | N/A | GA | 310 | 12 |
| 44 | 1.8 | 850 | 150 | 15.0 | 500 | 50 | 3.0 | 500 | 60 | 150 | 250 | <0.1 | GA | 310 | 12 |
| 45 | 1.8 | 850 | 150 | 15.0 | 500 | 50 | 3.0 | 500 | 60 | 250 | 5 | <0.1 | GA | 310 | 12 |
| 46 | 1.8 | 850 | 100 | 5.0 | 550 | 120 | 3.0 | 500 | 60 | 200 | 360 | <0.1 | GA | 309 | 18 |
| 47 | 1.8 | 860 | 100 | 5.0 | 550 | 120 | 3.0 | 500 | 60 | 280 | 250 | <0.1 | GA | 309 | 28 |
| 48 | 1.8 | 860 | 100 | 5.0 | 550 | 120 | 3.0 | 500 | 60 | 280 | 250 | 0.6 | GA | 309 | 28 |
| 49 | 1.8 | 860 | 100 | 14.0 | 550 | 120 | 3.0 | 500 | 60 | 280 | 250 | <0.1 | GA | 309 | 28 |
| 50 | 1.8 | 860 | 100 | 1.5 | 550 | 120 | 3.0 | 500 | 60 | 280 | 250 | <0.1 | GA | 309 | 28 |

Underlines indicate that corresponding values are outside the scope of the present invention.

TABLE 4A

| No. | Steel type | Plating type | Ferrite (%) | Bainite (%) | Retained austenite (%) | Tempered martensite (%) | Fresh maitensite (%) | Pearlite (%) | Concentration of hydrogen in steel (mass ppm) |
|---|---|---|---|---|---|---|---|---|---|
| 1 | A | GA | 0 | 8 | 4 | 86 | 2 | 0 | 0.19 |
| 2 | A | GA | 0 | 8 | 4 | 86 | 2 | 0 | 0.62 |
| 3 | A | GA | 0 | 8 | 4 | 86 | 2 | 0 | 0.66 |
| 4 | A | GA | 18 | 5 | 5 | 70 | 2 | 0 | 0.18 |
| 5 | A | GA | 0 | 24 | 5 | 54 | 17 | 0 | 0.31 |
| 6 | A | GA | 0 | 8 | 4 | 86 | 2 | 0 | 0.57 |
| 7 | A | GA | 0 | 5 | 3 | 86 | 6 | 0 | 0.34 |
| 8 | A | GA | 0 | 8 | 4 | 86 | 2 | 0 | 0.64 |
| 9 | A | GA | 0 | 14 | 6 | 72 | 8 | 0 | 0.21 |
| 10 | A | GA | 0 | 8 | 4 | 86 | 2 | 0 | 0.10 |
| 11 | A | GA | 0 | 8 | 5 | 85 | 2 | 0 | 0.55 |
| 12 | A | GA | 0 | 8 | 5 | 85 | 2 | 0 | 0.09 |
| 13 | A | GA | 0 | 8 | 4 | 86 | 2 | 0 | 0.13 |
| 14 | A | GA | 0 | 6 | 4 | 80 | 2 | 0 | 0.17 |
| 15 | A | GA | 0 | 10 | 1 | 84 | 1 | 4 | 0.19 |
| 16 | A | GA | 0 | 8 | 4 | 86 | 2 | 0 | 0.63 |
| 17 | A | GI | 0 | 8 | 4 | 86 | 2 | 0 | 0.24 |
| 18 | A | GA | 0 | 17 | 5 | 75 | 3 | 0 | 0.15 |
| 19 | A | GA | 0 | 12 | 3 | 83 | 2 | 0 | 0.08 |
| 20 | A | GA | 0 | 8 | 4 | 86 | 2 | 0 | 0.58 |
| 21 | A | GA | 17 | 10 | 4 | 67 | 2 | 0 | 0.17 |
| 22 | A | GA | 0 | 28 | 5 | 65 | 2 | 0 | 0.15 |
| 23 | B | GA | 0 | 6 | 5 | 84 | 5 | 0 | 0.20 |
| 24 | C | GA | 0 | 8 | 5 | 84 | 3 | 0 | 0.18 |
| 25 | D | GA | 0 | 8 | 4 | 86 | 2 | 0 | 0.21 |

| No. | TS (MPa) | El (%) | Hole expansion ratio (%) | TS [MPa] × EL [%] × λ [%]$^{0.5}$ × $10^{-3}$ | Hydrogen embrittlement resistance (MPa) | Ductile-brittle transition temperature (°C.) | Plating adhesion | Note |
|---|---|---|---|---|---|---|---|---|
| 1 | 1553 | 8.1 | 46 | 85 | >1200 | <−40 | G | Invention Example |
| 2 | 1555 | 7.7 | 41 | 77 | ≤1000 | <−40 | G | Comparative Example |
| 3 | 1551 | 7.6 | 35 | 70 | ≤1000 | <−40 | G | Comparative Example |
| 4 | 1411 | 9.3 | 28 | 69 | >1200 | <−40 | G | Comparative Example |
| 5 | 1654 | 7.2 | 15 | 46 | 1000 to 1200 | −20 | G | Comparative Example |
| 6 | 1635 | 7.4 | 36 | 73 | 1000 | −20 | G | Comparative Example |
| 7 | 1597 | 7.9 | 40 | 80 | 1000 to 1200 | <−40 | G | Invention Example |
| 8 | 1552 | 7.5 | 36 | 70 | <1000 | <−40 | G | Comparative Example |
| 9 | 1552 | 8.3 | 25 | 64 | >1200 | <−40 | G | Invention Example |
| 10 | 1207 | 10.9 | 57 | 99 | >1200 | <−40 | G | Comparative Example |
| 11 | 1638 | 7.0 | 33 | 66 | ≤1000 | −20 | G | Comparative Example |
| 12 | 1477 | 8.4 | 50 | 88 | >1200 | <−40 | G | Invention Example |
| 13 | 1408 | 8.5 | 52 | 86 | >1200 | <−40 | G | Comparative Example |
| 14 | 1507 | 9.0 | 23 | 65 | >1200 | <−40 | G | Invention Example |
| 15 | 1525 | 7.8 | 27 | 62 | >1200 | <−40 | G | Invention Example |
| 16 | 1640 | 7.5 | 20 | 55 | ≤1000 | 0 | G | Comparative Example |
| 17 | 1558 | 7.9 | 42 | 80 | >1200 | <−40 | G | Invention Example |

TABLE 4A-continued

| | | | | | | | | |
|---|---|---|---|---|---|---|---|---|
| 18 | 1487 | 8.6 | 39 | 80 | >1200 | <−40 | G | Invention Example |
| 19 | 1259 | 9.8 | 35 | 73 | >1200 | <−40 | G | Comparative Example |
| 20 | 1553 | 8.1 | 46 | 85 | ≤1000 | <−40 | G | Comparative Example |
| 21 | 1443 | 8.0 | 24 | 57 | <1200 | <−40 | G | Comparative Example |
| 22 | 1430 | 8.2 | 28 | 62 | <1200 | <−40 | G | Comparative Example |
| 23 | 1824 | 7.2 | 28 | 69 | <1200 | <−40 | G | Invention Example |
| 24 | 1508 | 9.5 | 37 | 87 | <1200 | <−40 | G | Invention Example |
| 25 | 1524 | 8.6 | 40 | 83 | <1200 | <−40 | G | Invention Example |

Underlines indicate that corresponding values are outside the scope of the present invention or far from preferred characteristics.

TABLE 4B

| No. | Steel type | Plating type | Ferrite (%) | Bainite (%) | Retained austenite (%) | Tempered martensite (%) | Fresh maitensite (%) | Pearlite (%) | Concentration of hydrogen in steel (mass ppm) |
|---|---|---|---|---|---|---|---|---|---|
| 26 | E | GA | 0 | 10 | 4 | 84 | 2 | 0 | 0.16 |
| 27 | F | GA | 0 | 7 | 7 | 84 | 2 | 0 | 0.20 |
| 28 | G | GA | 0 | 7 | 5 | 85 | 3 | 0 | 0.18 |
| 29 | H | GA | 0 | 6 | 4 | 88 | 2 | 0 | 0.17 |
| 30 | I | GA | 0 | 6 | 4 | 88 | 2 | 0 | 0.20 |
| 31 | J | GA | 0 | 6 | 4 | 88 | 2 | 0 | 0.18 |
| 32 | K | GA | 0 | 6 | 4 | 88 | 2 | 0 | 0.23 |
| 33 | L | GA | 0 | 6 | 4 | 90 | 0 | 0 | 0.18 |
| 34 | M | GA | 0 | 5 | 6 | 85 | 4 | 0 | 0.20 |
| 35 | N | 6A | 0 | 0 | 7 | 85 | 8 | 0 | 0.21 |
| 36 | O | GA | 0 | 9 | 0 | 90 | 1 | 0 | 0.23 |
| 37 | P | GA | 0 | 7 | 10 | 80 | 3 | 0 | 0.19 |
| 38 | Q | GA | 0 | 8 | 3 | 88 | 1 | 0 | 0.16 |
| 39 | R | GA | 0 | 0 | 8 | 87 | 5 | 0 | 0.24 |
| 40 | S | GA | 20 | 18 | 3 | 59 | 0 | 0 | 0.10 |
| 41 | T | GA | 0 | 0 | 7 | 71 | 22 | 0 | 0.19 |
| 42 | U | GA | 0 | 0 | 8 | 71 | 21 | 0 | 0.19 |
| 43 | V | GA | 0 | 3 | 4 | 76 | 17 | 0 | 0.20 |
| 44 | V | GA | 0 | 3 | 4 | 81 | 12 | 0 | 0.20 |
| 45 | V | GA | 0 | 3 | 4 | 81 | 12 | 0 | 0.19 |
| 46 | A | GA | 0 | 8 | 3 | 84 | 5 | 0 | 0.30 |
| 47 | A | GA | 0 | 5 | 3 | 90 | 1 | 0 | 0.35 |
| 48 | A | GA | 0 | 5 | 3 | 91 | 1 | 0 | 0.42 |
| 49 | A | GA | 0 | 5 | 3 | 91 | 1 | 0 | 0.28 |
| 50 | A | GA | 0 | 5 | 3 | 91 | 1 | 0 | 0.15 |

| No. | TS (MPa) | El (%) | Hole expansion ratio (%) | TS [MPa] × EL [%] × λ [%]$^{0.5}$ × $10^{-3}$ | Hydrogen embrittlement resistance (MPa) | Ductile-brittle transition temperature (° C.) | Plating adhesion | Note |
|---|---|---|---|---|---|---|---|---|
| 26 | 1496 | 8.2 | 45 | 82 | >1200 | <−40 | G | Invention Example |
| 27 | 1490 | 9.3 | 38 | 85 | >1200 | <−40 | G | Comparative Example |
| 28 | 1525 | 8.9 | 39 | 85 | >1200 | <−40 | G | Comparative Example |
| 29 | 1530 | 8.6 | 42 | 85 | >1200 | <−40 | G | Comparative Example |
| 30 | 1512 | 9.1 | 42 | 89 | >1200 | <−40 | G | Comparative Example |
| 31 | 1524 | 8.9 | 40 | 86 | >1200 | <−40 | G | Comparative Example |

TABLE 4B-continued

| | | | | | | | | |
|---|---|---|---|---|---|---|---|---|
| 32 | 1527 | 8.7 | 41 | 85 | >1200 | <−40 | G | Invention Example |
| 33 | 1491 | 7.6 | 50 | 80 | >1200 | <−40 | G | Comparative Example |
| 34 | 1791 | 7.0 | 33 | 72 | >1200 | <−40 | G | Invention Example |
| 35 | 1485 | 8.7 | 22 | 61 | >1200 | <−40 | G | Comparative Example |
| 36 | 1523 | 6.3 | 55 | 71 | >1200 | <−40 | G | Comparative Example |
| 37 | 1525 | 10.0 | 23 | 73 | >1200 | <−40 | G | Invention Example |
| 38 | <u>1293</u> | 10.4 | 29 | 72 | >1200 | <−40 | G | Comparative Example |
| 39 | 2006 | 4.6 | 8 | <u>26</u> | ≤1000 | <−40 | G | Invention Example |
| 40 | <u>1314</u> | 10.0 | 23 | 63 | >1200 | <−40 | G | Invention Example |
| 41 | 1767 | 6.9 | 5 | <u>27</u> | >1200 | 0 | G | Comparative Example |
| 42 | 1558 | 9.1 | 4 | <u>28</u> | >1200 | 0 | G | Invention Example |
| 43 | 1540 | 7.6 | 47 | 80 | ≤1000 | 0 | G | Invention Example |
| <u>44</u> | 1553 | 7.3 | 39 | 71 | ≤1000 | −20 | G | Comparative Example |
| <u>45</u> | 1531 | 7.2 | 49 | 77 | ≤1000 | −20 | G | Comparative Example |
| 46 | 1576 | 8.1 | 35 | 76 | >1200 | <−40 | G | Comparative Example |
| 47 | 1564 | 7.7 | 32 | 68 | 1000 to 1200 | <−40 | G | Comparative Example |
| <u>48</u> | 1549 | 7.9 | 40 | 77 | ≤1000 | <−40 | G | Invention Example |
| 49 | 1559 | 8.0 | 45 | 84 | >1200 | <−40 | G | Invention Example |
| 50 | 1551 | 8.2 | 50 | 90 | >1200 | <−40 | G | Invention Example |

Underlines indicate that corresponding values are outside the scope of the present invention or far from preferred characteristics.

INDUSTRIAL APPLICABILITY

According to the above-described aspects of the present invention, it is possible to provide a zinc-plated steel sheet that is preferably used as vehicle members, has excellent mechanical properties, has a reduced amount of hydrogen that has infiltrated the steel sheet during the manufacturing of the steel sheet, and is excellent in terms of the hydrogen embrittlement resistance and the plating adhesion and a manufacturing method thereof. According to the preferred aspects of the present invention, it is possible to provide a zinc-plated steel sheet that has a variety of characteristics described above and further has excellent low temperature toughness and a manufacturing method thereof.

What is claimed is:
1. A zinc-plated steel sheet comprising:
a steel sheet; and
a zinc-plated layer disposed on a surface of the steel sheet,
the steel sheet has a chemical composition containing, by mass %,
C: 0.150% to 0.500%,
Si: 0.01% to 2.50%,
Mn: 1.00% to 5.00%,
P: 0.100% or less,
S: 0.0100% or less,
Al: 0.001% to 1.000%,
N: 0.0100% or less,
O: 0.0100% or less,
Cr: 0% to 2.00%,
Mo: 0% to 1.00%,
B: 0% to 0.010%,
Cu: 0% to 1.00%,
Ni: 0% to 1.00%,
Co: 0% to 1.00%,
W: 0% to 1.00%,
Sn: 0% to 1.00%,
Sb: 0% to 0.50%,
Ti: 0% to 0.30%,
Nb: 0% to 0.30%,
V: 0% to 1.00%,
Ca: 0% to 0.0100%,
Mg: 0% to 0.0100%,
Ce: 0% to 0.0100%,
Zr: 0% to 0.0100%,
La: 0% to 0.0100%,
Hf: 0% to 0.0100%,
Bi: 0% to 0.0100%, and
REM: 0% to 0.0100%
with a remainder including Fe and an impurity,
steel microstructures in a range of ⅛ thickness to ⅜ thickness, having a center at ¼ thickness from the surface of the steel sheet, include, by vol %,
ferrite: 0% to 10%,
bainite: 0% to 20%,
tempered martensite: 70% or more,
fresh martensite: 0% to 10%,
retained austenite: 0% to 10%, and
pearlite: 0% to 5%,
an amount of hydrogen that is emitted when the steel sheet is heated up to 200° C. from a room temperature after removal of the zinc-plated layer is 0.40 ppm or less per mass of the steel sheet, a tensile strength is 1470 MPa or more, and
cracking does not occur in a U-shape bending test in which a stress equivalent to 1000 MPa is applied for 24 hours.

2. The zinc-plated steel sheet according to claim 1, wherein the chemical composition of the steel sheet contains one or more of
Cr: 0.001% to 2.00%,
Mo: 0.001% to 1.00%,
B: 0.0001% to 0.010%,
Cu: 0.001% to 1.00%,
Ni: 0.001% to 1.00%,
Co: 0.001% to 1.00%,
W: 0.001% to 1.00%,
Sn: 0.001% to 1.00%, and
Sb: 0.001% to 0.50%.

3. The zinc-plated steel sheet according to claim 1, wherein the chemical composition of the steel sheet contains one or more of
Ti: 0.001% to 0.30%,
Nb: 0.001% to 0.30%, and
V: 0.001% to 1.00%.

4. The zinc-plated steel sheet according to claim 1, wherein the chemical composition of the steel sheet contains one or more of
Ca: 0.0001% to 0.0100%,
Mg: 0.0001% to 0.0100%,
Ce: 0.0001% to 0.0100%,
Zr: 0.0001% to 0.0100%,
La: 0.0001% to 0.0100%,
Hf: 0.0001% to 0.0100%,
Bi: 0.0001% to 0.0100%, and
REM: 0.0001% to 0.0100%.

5. The zinc-plated steel sheet according to claim 1, wherein a ductile-brittle transition temperature is −40° C. or lower.

6. A manufacturing method of the zinc-plated steel sheet according to claim 1, wherein each of (I) to (IV) is sequentially carried out on the steel sheet:
(I) annealing the steel sheet under conditions of a heating temperature: an $Ac_3$ point to 950° C. and a retention time in a temperature range of the $Ac_3$ point to 950° C.: 1 to 500 s and maintaining a concentration of hydrogen in a furnace at 1.0 to 15.0 vol % at all times from when a steel sheet temperature reaches 600° C. until when retention of the steel sheet in the temperature range of the $Ac_3$ point to 950° C. ends;
(II) retaining the steel sheet in a temperature range of an Ms point to 600° C. for 20 to 500 s and maintaining the concentration of hydrogen in the furnace at 1.0 to 10.0 vol % at all times during the retention of the steel sheet;
(III) immersing the steel sheet in a hot-dip galvanizing bath and then cooling the steel sheet until the steel sheet temperature reaches lower than the Ms point −150° C.; and
(IV) retaining the steel sheet in an atmosphere having a concentration of hydrogen of less than 0.50 vol % in a temperature range of 200° C. or higher and lower than 350° C. for 10 to 1000 s and then coiling the steel sheet in a coil shape; thereby producing the zinc-plated steel sheet of claim 1.

7. The manufacturing method of the zinc-plated steel sheet according to claim 6, wherein the (III) is cooling of the steel sheet until the steel sheet temperature reaches lower than the Ms point −150° C. after immersion of the steel sheet in the hot-dip galvanizing bath and then an alloying treatment that is carried out in a temperature range of 460° C. to 600° C.

8. The zinc-plated steel sheet according to claim 2, wherein the chemical composition of the steel sheet contains one or more of
Ti: 0.001% to 0.30%,
Nb: 0.001% to 0.30%, and
V: 0.001% to 1.00%.

9. The zinc-plated steel sheet according to claim 2, wherein the chemical composition of the steel sheet contains one or more of
Ca: 0.0001% to 0.0100%,
Mg: 0.0001% to 0.0100%,
Ce: 0.0001% to 0.0100%,
Zr: 0.0001% to 0.0100%,
La: 0.0001% to 0.0100%,
Hf: 0.0001% to 0.0100%,
Bi: 0.0001% to 0.0100%, and
REM: 0.0001% to 0.0100%.

10. The zinc-plated steel sheet according to claim 3, wherein the chemical composition of the steel sheet contains one or more of
Ca: 0.0001% to 0.0100%,
Mg: 0.0001% to 0.0100%,
Ce: 0.0001% to 0.0100%,
Zr: 0.0001% to 0.0100%,
La: 0.0001% to 0.0100%,
Hf: 0.0001% to 0.0100%,
Bi: 0.0001% to 0.0100%, and
REM: 0.0001% to 0.0100%.

11. The zinc-plated steel sheet according to claim 2, wherein a ductile-brittle transition temperature is −40° C. or lower.

12. The zinc-plated steel sheet according to claim 3, wherein a ductile-brittle transition temperature is −40° C. or lower.

13. The zinc-plated steel sheet according to claim 4, wherein a ductile-brittle transition temperature is −40° C. or lower.

14. A manufacturing method of the zinc-plated steel sheet according to claim 2, wherein each of (I) to (IV) is sequentially carried out on the steel sheet:
(I) annealing the steel sheet under conditions of a heating temperature: an $Ac_3$ point to 950° C. and a retention time in a temperature range of the $Ac_3$ point to 950° C.: 1 to 500 s and maintaining a concentration of hydrogen in a furnace at 1.0 to 15.0 vol % at all times from when a steel sheet temperature reaches 600° C. until when retention of the steel sheet in the temperature range of the $Ac_3$ point to 950° C. ends;
(II) retaining the steel sheet in a temperature range of an Ms point to 600° C. for 20 to 500 s and maintaining the concentration of hydrogen in the furnace at 1.0 to 10.0 vol % at all times during the retention of the steel sheet;
(III) immersing the steel sheet in a hot-dip galvanizing bath and then cooling the steel sheet until the steel sheet temperature reaches lower than the Ms point −150° C.; and
(IV) retaining the steel sheet in an atmosphere having a concentration of hydrogen of less than 0.50 vol % in a temperature range of 200° C. or higher and lower than 350° C. for 10 to 1000 s and then coiling the steel sheet in a coil shape; thereby producing the zinc-plated steel sheet of claim 2.

15. A manufacturing method of the zinc-plated steel sheet according to claim 3, wherein each of (I) to (IV) is sequentially carried out on the steel sheet:
- (I) annealing the steel sheet under conditions of a heating temperature: an $Ac_3$ point to 950° C. and a retention time in a temperature range of the $Ac_3$ point to 950° C.: 1 to 500 s and maintaining a concentration of hydrogen in a furnace at 1.0 to 15.0 vol % at all times from when a steel sheet temperature reaches 600° C. until when retention of the steel sheet in the temperature range of the $Ac_3$ point to 950° C. ends;
- (II) retaining the steel sheet in a temperature range of an Ms point to 600° C. for 20 to 500 s and maintaining the concentration of hydrogen in the furnace at 1.0 to 10.0 vol % at all times during the retention of the steel sheet;
- (III) immersing the steel sheet in a hot-dip galvanizing bath and then cooling the steel sheet until the steel sheet temperature reaches lower than the Ms point −150° C.; and
- (IV) retaining the steel sheet in an atmosphere having a concentration of hydrogen of less than 0.50 vol % in a temperature range of 200° C. or higher and lower than 350° C. for 10 to 1000 s and then coiling the steel sheet in a coil shape; thereby producing the zinc-plated steel sheet of claim 3.

16. A manufacturing method of the zinc-plated steel sheet according to claim 4, wherein each of (I) to (IV) is sequentially carried out on the steel sheet:
- (I) annealing the steel sheet under conditions of a heating temperature: an $Ac_3$ point to 950° C. and a retention time in a temperature range of the $Ac_3$ point to 950° C.: 1 to 500 s and maintaining a concentration of hydrogen in a furnace at 1.0 to 15.0 vol % at all times from when a steel sheet temperature reaches 600° C. until when retention of the steel sheet in the temperature range of the $Ac_3$ point to 950° C. ends;
- (II) retaining the steel sheet in a temperature range of an Ms point to 600° C. for 20 to 500 s and maintaining the concentration of hydrogen in the furnace at 1.0 to 10.0 vol % at all times during the retention of the steel sheet;
- (III) immersing the steel sheet in a hot-dip galvanizing bath and then cooling the steel sheet until the steel sheet temperature reaches lower than the Ms point −150° C.; and
- (IV) retaining the steel sheet in an atmosphere having a concentration of hydrogen of less than 0.50 vol % in a temperature range of 200° C. or higher and lower than 350° C. for 10 to 1000 s and then coiling the steel sheet in a coil shape; thereby producing the zinc-plated steel sheet of claim 4.

* * * * *